United States Patent [19]
Nagashima

[11] Patent Number: 6,027,238
[45] Date of Patent: Feb. 22, 2000

[54] KINEMATIC ARITHMETIC METHOD AND APPARATUS

[75] Inventor: Fumio Nagashima, Kawasaki, Japan

[73] Assignee: Fujitsu Ltd., Kawasaki, Japan

[21] Appl. No.: 08/682,111

[22] Filed: Jul. 17, 1996

[30] Foreign Application Priority Data

Nov. 20, 1995 [JP] Japan .................................. 7-301786

[51] Int. Cl.[7] .................................................. G05B 11/01
[52] U.S. Cl. ................. 364/174; 364/167.02; 318/568.1; 318/568.11; 318/568.16; 318/568.24
[58] Field of Search ............................... 364/167.01, 174, 364/167.02; 318/568.1, 568.11, 568.16, 568, 22, 568.24; 901/2, 8, 15, 23, 28, 46, 48

[56] References Cited

U.S. PATENT DOCUMENTS

| | | | |
|---|---|---|---|
| 4,547,888 | 10/1985 | Horak | 364/193 |
| 4,925,312 | 5/1990 | Onaga et al. | 364/174 |
| 5,430,643 | 7/1995 | Seraji | 364/167.01 |

*Primary Examiner*—Reba I. Elmore
*Assistant Examiner*—Ramesh Patel
*Attorney, Agent, or Firm*—Staas & Halsey

[57] ABSTRACT

There are provided kinematic arithmetic method and apparatus for evaluating positions and orientations of links of a link mechanism in which a plurality of links are coupled through joints. An angular acceleration of a joint is evaluated by substituating on a numerical basis an angle, an angular velocity, and a torque, of the joint into a relation. A numerical integration of the angular acceleration of the joint thus determined is preformed to evaluate the angle of the joint. A kinematics operation is performed to evaluate positions and orientations of the links on the basis of the angle of the joint determined through the numerical integration. A resultant of the kinematics operation is displayed.

25 Claims, 10 Drawing Sheets

KINEMATIC ARITHMETIC METHOD AND APPARATUS

BACKGROUND OF THE INVENTION

1. Field of the Invention

The present invention relates to kinematic arithmetic method and apparatus for evaluating positions and orientations of links of a link mechanism in which a plurality of links are coupled through joints.

2. Description of the Related Art

Hitherto, there are constructed various kinds of link mechanisms. Further, the analysis for those link mechanisms is performed in various fields, such as a robot simulator, a tool for producing animations, an interactive robot control apparatus, mechanism design tools, ergonomics and the like.

A link mechanism is provided with, as shown in FIG. 1, an arrangement in which a plurality of links are coupled via joints with one another. Joints modeled for an analysis of the link mechanism are expressed by a rotary type of joint of 1 of degrees of freedom and a direct acting type of 1 of degrees of freedom. A multi-degrees of number of joint, like a person's shoulder, can be expressed by arranging those two types of joints at a single place with a plurality of pieces of joints. By way of examples of such a link mechanism, there are raised cars, machine tools, robots, a human and the like. The use of such a link mechanism makes it possible to express almost all things or objects having a movable member.

In an analysis of the link mechanism, it is referred to as a forward kinematics that angles of the joints in case of the rotary type are given, and a displacement of the joints in case of the direct acting is given, so that a position of the link (in the narrow sense, the tip of the link mechanism) and its orientation are determined. On the other hand, it is referred to as an inverse kinematics that position information of the link (in the narrow sense, the tip of the link mechanism) is given to determine angles of the joints and the displacement.

In case of the link mechanism, a rotary type of joint is often used. Thus, in some cases, as far as joints are not against their nature, and in addition the used terms are not distinguished from one another, there will be represented physical expressions involved in the rotary type of joints, such as an angle, an angular velocity, an angular acceleration, and torque. In other words, in case of a direct acting type of joint, the terms "an angle, an angular velocity, an angular acceleration, and torque" are replaced in read by the terms "a displacement, a velocity, an acceleration, and a force", respectively.

Hitherto, while the above-mentioned link mechanism is analyzed, an arithmetic operation of the kinematics is performed in accordance with geometric conditions. According to this scheme, there is a need to cope individually depending on an arrangement of joints of the link mechanism. Further, there is a possibility that the conventional scheme involves a mathematical difficulty such that in some cases the analytic solution is a failure owing to parts of a manipulator and errors in assembling.

There is a scheme of processing on a mathematical basis using the geometric conditions. This scheme involves such a problem that it takes a lot of time.

Further, there has been proposed a technique involved in a combination of the analytic scheme and the numerical scheme. However, it is effective for only an analysis of the link mechanism having the number of degrees of freedom not more than 6 of degrees of freedom, since exceeding 6 of degrees of freedom involves a problem of redundancy.

Furthermore, there is a scheme in which a relation (Jacobian) of an angular velocity (including a velocity) is used. However, this scheme involves a problem of an irregular point such that a motion of the link mechanism exceeds a maximum angular velocity (including a maximum angular velocity) which is realizable.

SUMMARY OF THE INVENTION

In view of the foregoing, it is therefore an object of the present invention to provide a kinematic arithmetic method which involves no problem of an irregular point and is of high versatility, and a kinematic arithmetic apparatus for implementing said kinematic arithmetic method.

FIG. 2 is a basic flowchart useful for understanding a kinematic arithmetic method according to the present invention.

To achieve the above-mentioned objects, according to the present invention, there is provided a kinematic arithmetic method for evaluating positions and orientations of links of a link mechanism in which a plurality of links are coupled through joints, comprising:

a first step of evaluating an angular acceleration (including an acceleration) $\ddot{q}$ (hereinafter, referred to as "q 2 dots") of a joint by substituting on a numerical basis an initial value of an angle (including a displacement) q, an initial value of an angular velocity (including a velocity) $\dot{q}$ (hereinafter, referred to as "q dot"), and an initial value of a torque $\tau$ (including a force), of the joint into a relation $$f(\ddot{q},\dot{q},q, \tau, p_1, \ldots ,p_m)=0 \qquad (1)$$

where $p_1, \ldots , p_m$ stand for parameters other than torque $\tau$ defining a relationship between the angle, the angular velocity, the angular acceleration, and the torque, of the joint;

a second step of evaluating the angular velocity q dot, and the angle q, of the joint by practicing a numerical integration of the angular acceleration q 2 dots of the joint determined through the numerical substitution of the angle q, the angular velocity q dot, and the torque$\tau$, of the joint into said relation (1);

a third step of evaluating the angular acceleration q 2 dots of the joint by substituting on a numerical basis into said relation (1) the angular velocity q dot, and the angle q, of the joint determined in the second step, and the initial value $\tau^0$ of the torque, of the joint, or updated torque $\tau$ instead of the initial value $\tau^0$; and a fourth step of evaluating positions and orientations of the links on the basis of the angle or the displacement of the joint determining in the second step, wherein the second step and the third step are alternately repeated, and the fourth step is repeatedly performed, thereby sequentially updating position s and orientations of the links.

This feature makes it possible to prevent an occurrence of the problem of the irregular point involved in the technique using the angular velocity relation (Jacobian), and also enables even a link mechanism having redundant degrees of freedom to be analyzed, avoiding the mathematical difficulty.

In the kinematic arithmetic method as mentioned above, it is acceptable that said relation (1) is a relation defining a relationship between the angle q, the angular velocity q dot, the angular acceleration q 2 dots, and the torque τ, of the joint, and in addition a force or a moment p acting on the link;

said first step is a step of evaluating the angular acceleration q 2 dots of the joint by substituting on a numerical basis into said relation (1) the initial value $q^0$ of the angle q, the initial value $\dot{q}^0$ dot of the angular velocity q dot, and the initial value $τ^0$ of the torque, of the joint, and in addition an initial value of the force or the moment $p^0$ acting on the link; and said third step is a step of evaluating the angular acceleration q 2 dots of the joint by substituting on a numerical basis into said relation (1) the angular velocity q dot, and the angle q, of the joint determined in the second step, and the initial value $τ^0$ of the torque, of the joint, or updated torque τ instead of the initial value $τ^0$, and in addition an initial value $p^0$ of the force and the moment acting on the link, or updated force and the moment p instead of the initial value.

In this case, while it is acceptable that the updated torque is directly fed from the exterior, it is also acceptable that when an imaginary object is disposed within a movement area of said link mechanism, an interference force between the imaginary object and the link of said link mechanism is substituted on a numerical basis into said relation in form of a force and a moment acting on the link.

Further, it is acceptable that when said link mechanism includes a closed loop, and when the closed loop is imaginarily cut at a predetermined position thereof, and force and moment corresponding to a mutual displacement rate between both edges created by cutting act on both the edges, said force and moment are substituted on a numerical basis into said relation in form of a force and a moment acting on two links each having an associated one of both the edges.

In this manner, in the kinematic arithmetic method, consideration of not only the joint torque but also the force and the moment acting on the link makes it possible to more spread the versatility of the kinematic arithmetic method according to the present invention in such points that the motion of the link mechanism is limited, the motion is harmonized with circumstances, and the analysis of the link mechanism having the closed loop becomes feasible.

In the kinematic arithmetic method as mentioned above, it is preferable that said first and third steps are of evaluating the angular acceleration q 2 dot of the joint using Newton-Euler's equation of motion as said relation.

The kinematic arithmetic method as mentioned above is spread in a field of application to, for example, the world of the animation. While there is no need to be always constrained by the physical law of the real world, the use of Newton-Euler's equation of motion in which the physical law of the real world is formulated makes it possible to implement a natural movement simulating the movement of an object in accordance with the physical law of the real world.

In case of using Newton-Euler's equation of motion, it is preferable that said first and third steps are of evaluating the angular acceleration g 2 dot of the joint using a recurrence formula of evaluating the torque or the force of the link from the angular acceleration q 2 dot of the joint, based on Newton-Euler's equation of motion, and an inverse solution of evaluating the angular acceleration of the joint from the torque of the link determined by said recurrence formula.

This recurrence formula is known as the recurrence algorithm of Walker & Orin type of inverse kinetics. Performing the arithmetic operation according to Newton-Euler's equation of motion using the recurrence formula and the inverse solution makes it possible to perform an extremely higher speed of arithmetic operation as compared with that of solving Newton-Euler's equation of motion as it is.

In case of using Newton-Euler's equation of motion, it is preferable that said first and third steps are of evaluating the angular acceleration q 2 dot of the joint using a recurrence formula of evaluating the angular acceleration of the joint from the torque of the joint, based on Newton-Euler's equation of motion.

This recurrence formula is known as the recurrence algorithm of Featherstone type of forward kinetics. Also the use of this recurrence formula makes it possible to perform an extremely higher speed of arithmetic operation to solve Newton-Euler's equation of motion.

In the kinematic arithmetic method according to the present invention, it is acceptable that said third step is a step of evaluating the angular acceleration q 2 dots of the joint by substituting on a numerical basis into said relation (1) the angular velocity q dot, and the angle q, of the joint determined in the second step, and a torque τ according to a distance between a current position of a tip edge of the link mechanism, of the joint, and a target position.

To execute the kinematics operation, the joint torque is given as the variable to analyze how the link (particularly, the tip of the link mechanism) travels. At that time, while it is acceptable that the joint torque τ as the variable is inputted one by one, providing such an arrangement that as described above, a torque τ according to a distance between a current position of a tip edge of the link mechanism, of the joint, and a target position is substituted on a numerical basis into said relation (1), makes it possible, through simply inputting the target position of the tip of the link mechanism, to perform the arithmetic operation equivalent to that of the joint torque τ as the variable being inputted one by one.

Further, in the kinematic arithmetic method according to the present invention, it is preferable that said method further comprises a fifth step of displaying the link mechanism comprising the links having positions and the orientations determined in the fourth step on a display screen for displaying the link mechanism.

This feature makes it possible to readily grasp the state of the movement of the link mechanism.

FIG. 3 is a principle block diagram of a first kinematic arithmetic apparatus according to the present invention.

To achieve the above-mentioned objects, according to the present invention, there is provided a first kinematic apparatus for evaluating positions and orientations of links of a link mechanism in which a plurality of links are coupled through joints, as shown in FIG. 3, comprising:

arithmetic means 1 for evaluating an angular acceleration q 2 dots of a joint by substituting on a numerical basis an angle q, an angular velocity q dot, and a torque τ, of the joint into a relation (1) defining a relationship between the angle q, the angular velocity q dot, the angular acceleration q 2 dot, and the torque τ, of the joint;

input means 2 for inputting a torque τ of the joint to said arithmetic means 1;

numerical integration means 3 for performing a numerical integration for the angular acceleration q 2 dots of the joint determined in said arithmetic means 1 to evaluate the angular velocity q dot, and the angle q, of the joint, a resultant of evaluating being inputted to said arithmetic means 1; and kinematics means 4 for evaluating positions and orientations of the links on the basis of the angle q of the joint determined in the numerical integration means 3.

According to the first kinematic apparatus of the present invention, there is provided with the input means 2. This feature makes it possible to perform the kinematic operation while updating the joint torque $\tau$ whenever necessary, thereby leading the tip of the link mechanism for instance to the target position.

FIG. 4 is a principle block diagram of a second kinematic arithmetic apparatus according to the present invention.

To achieve the above-mentioned objects, according to the present invention, there is provided a second kinematic arithmetic apparatus for evaluating positions and orientations of links of a link mechanism in which a plurality of links are coupled through joints, comprising:

arithmetic means 1 for evaluating an angular acceleration q 2 dots of a joint by substituting on a numerical basis an angle q, an angular velocity q dot, and a torque $\tau$, of the joint into a relation (1) defining a relationship between the angle q, the angular velocity q dot, the angular acceleration q 2 dots, and the torque $\tau$, of the joint;

input means 5 for inputting a target position of a tip edge of the link mechanism;

torque set means 6 for setting a torque according to a distance between a current position of the tip edge of the link mechanism, of the joint, and the target position inputted by said input means 5;

numerical integration means 3 for performing a numerical integration for the angular acceleration q 2 dots of the joint determined in said arithmetic means 1 to evaluate the angular velocity q dot, and the angle q, of the joint, a resultant of evaluating being inputted to said arithmetic means 1; and kinematics means 4 for evaluating positions and orientations of the links on the basis of the angle q of the joint determined in the numerical integration means 3.

According to the second kinematic apparatus of the present invention, there are provided with the input means 5 for inputting the target position, and the torque set means 6 for setting a torque. This feature makes it possible, through simply inputting the target position of the tip of the link mechanism, to set the joint torque $\tau$, thereby leading the tip of the link mechanism to the target position, without inputting the joint torque $\tau$ one by one.

In the first and second kinematic arithmetic apparatuses as mentioned above, it is preferable that said relation (1) is a relation defining a relationship between the angle q, the angular velocity q dot, the angular acceleration q 2 dots, and the torque $\tau$, of the joint, and in addition a force and a moment acting on the link, and said arithmetic means 1 evaluates the angular acceleration q 2 dot of the joint by substituting on a numerical basis into said relation (1) the angle q, the angular velocity q dot, and the torque $\tau$, of the joint, and in addition the force and the moment acting on the link.

In this case, in the first and second kinematic arithmetic apparatuses as mentioned above, it is preferable that said apparatus further comprises imaginary object disposing means 7 for disposing an imaginary object within a movement area of said link mechanism, and said arithmetic means 1 substitutes an interference force between the imaginary object and the link of said link mechanism, and a moment due to the interference force, on a numerical basis into said relation (1) in form of a force and a moment acting on the link.

Further, in the first and second kinematic arithmetic apparatuses as mentioned above, it is preferable that said link mechanism includes a closed loop, and when the closed loop is imaginarily cut at a predetermined position thereof, and force and moment corresponding to a mutual displacement rate between both edges created by cutting act on both the edges, said arithmetic means substitutes said force and moment on a numerical basis into said relation in form of a force and a moment acting on two links each having an associated one of both the edges.

Furthermore, in the first and second kinematic arithmetic apparatuses as mentioned above, it is preferable that said arithmetic means evaluates the angular acceleration q 2 dot of the joint using Newton-Euler's equation of motion as said relation (1).

In this case, it is preferable that said arithmetic means 1 evaluates the angular acceleration q 2 dots of the joint using a recurrence formula of evaluating the torque of the link from the angular acceleration q 2 dots of the joint, based on Newton-Euler's equation of motion, and an inverse solution of evaluating the angular acceleration q 2 dots of the joint from the torque $\tau$ of the link determined by said recurrence formula.

Further, in this case, it is also preferable that said arithmetic means 1 evaluates the angular acceleration q 2 dots of the joint using a recurrence formula of evaluating the angular acceleration q 2 dots of the joint from the torque $\tau$ of the joint, based on Newton-Euler's equation of motion.

Still furthermore, in the first and second kinematic arithmetic apparatuses as mentioned above, it is preferable that said apparatus further comprises display means 8 for displaying the link mechanism comprising the links having positions and the orientations determined in said kinematics means 4 on a display screen for displaying the link mechanism.

DESCRIPTION OF THE PREFERRED EMBODIMENTS

Hereinafter, there will be described embodiments of the present invention in conjunction with the accompanying drawings.

Figure 1:
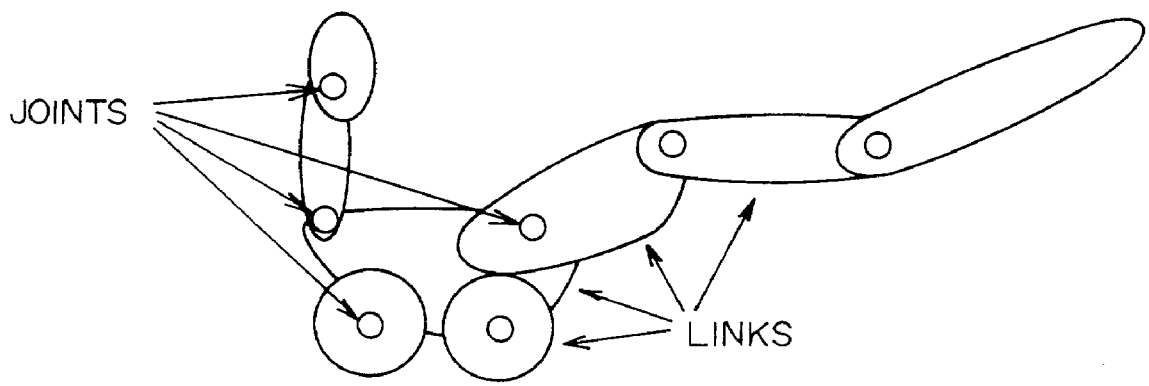
FIG. 1 is an illustration of a link mechanism provided with, by way of example, an arrangement in which a plurality of links are coupled via joints with one another.
Figure 2:
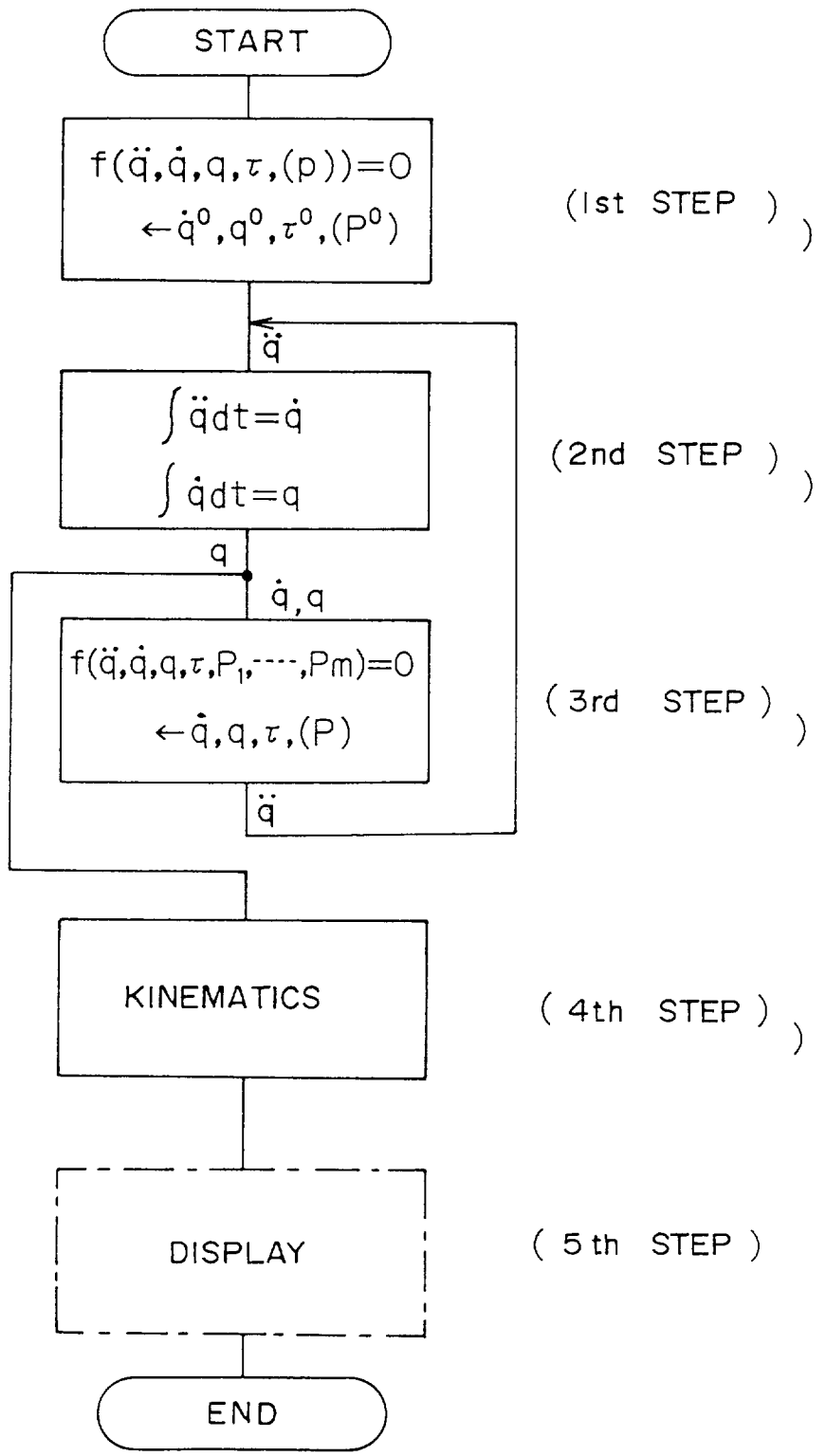
FIG. 2 is a basic flowchart useful for understanding a kinematic arithmetic method according to the present invention.
Figure 3:
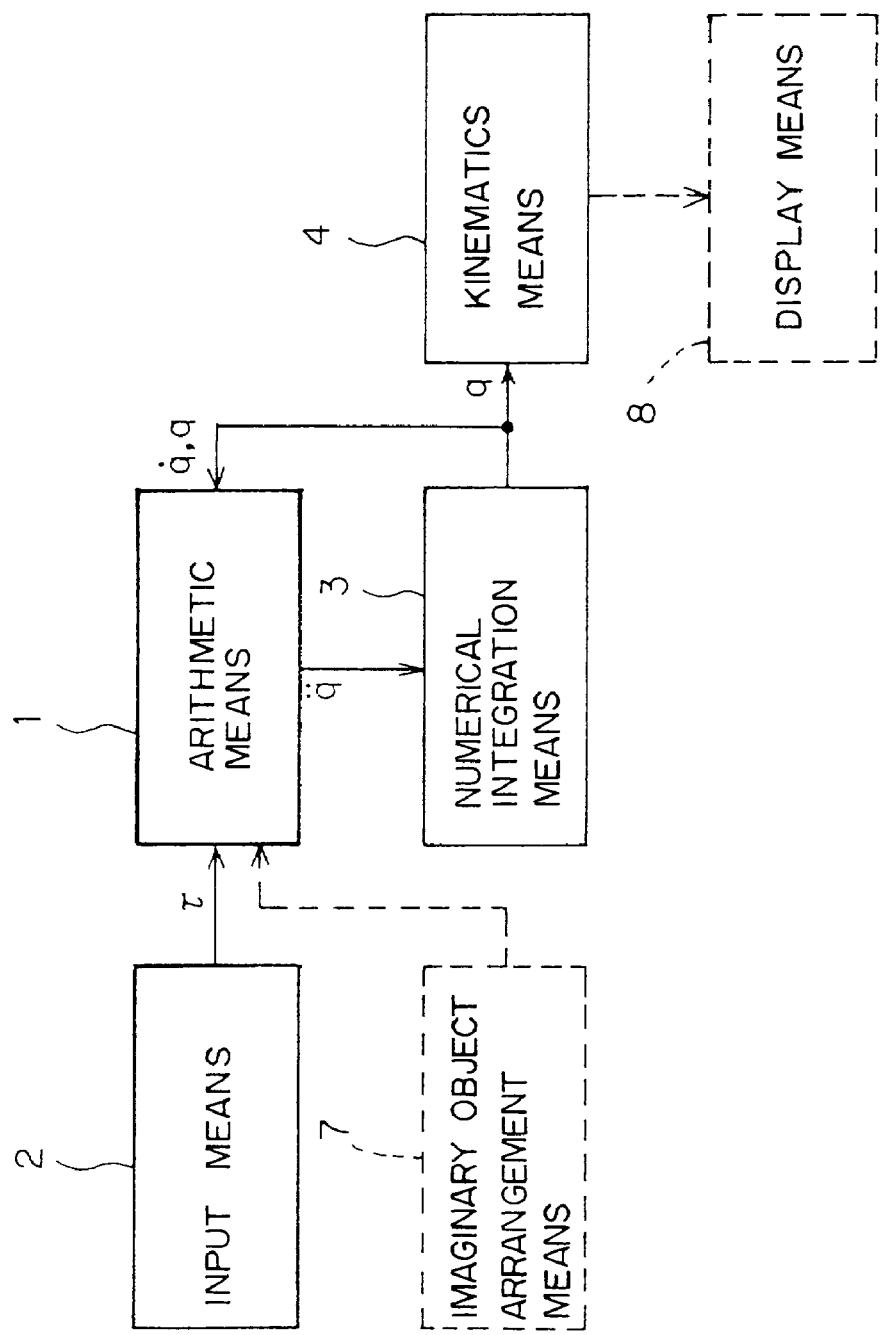
FIG. 3 is a principle block diagram of a first kinematic arithmetic apparatus according to the present invention.
Figure 4:
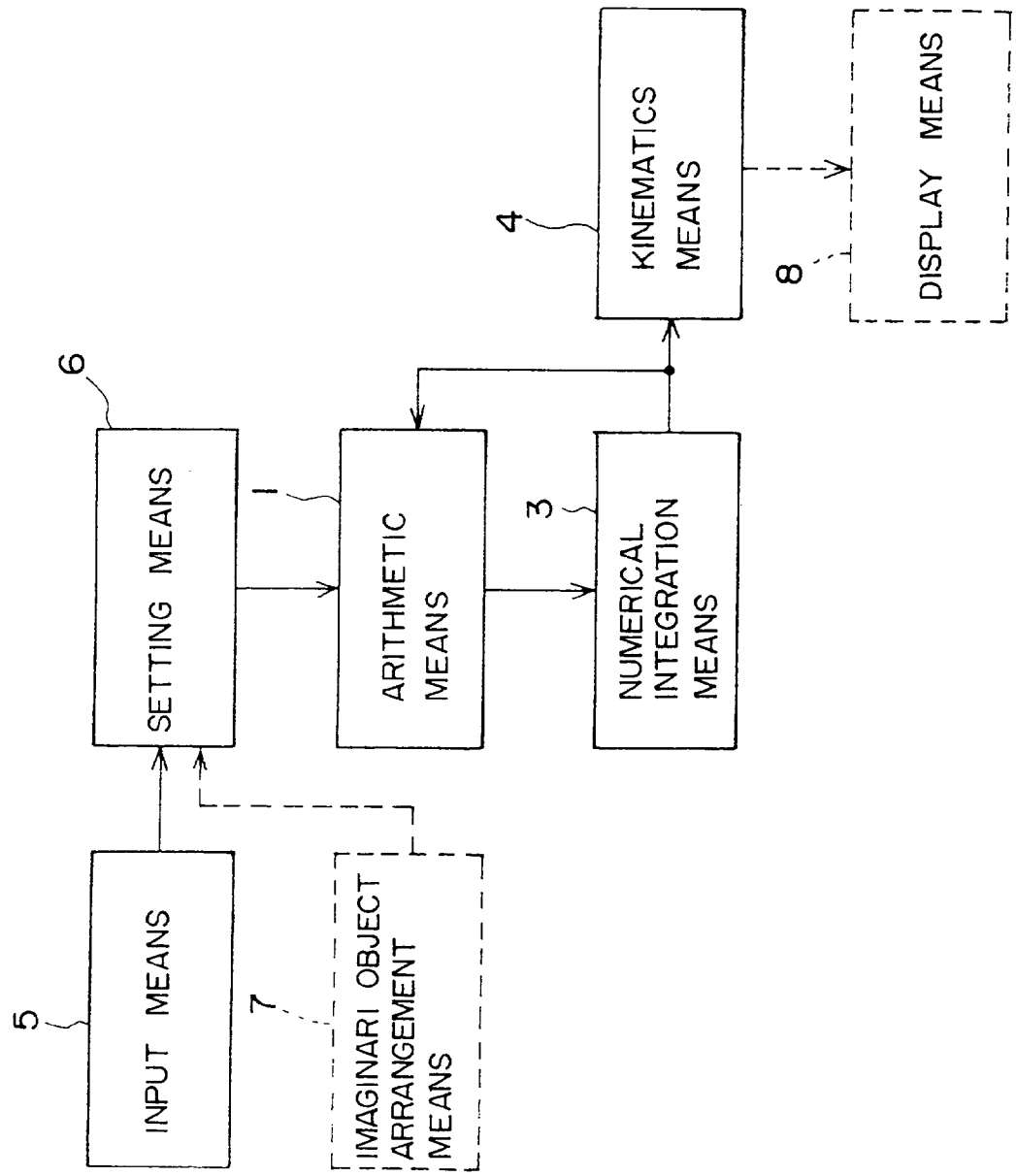
FIG. 4 is a principle block diagram of a second kinematic arithmetic apparatus according to the present invention.
Figure 5:
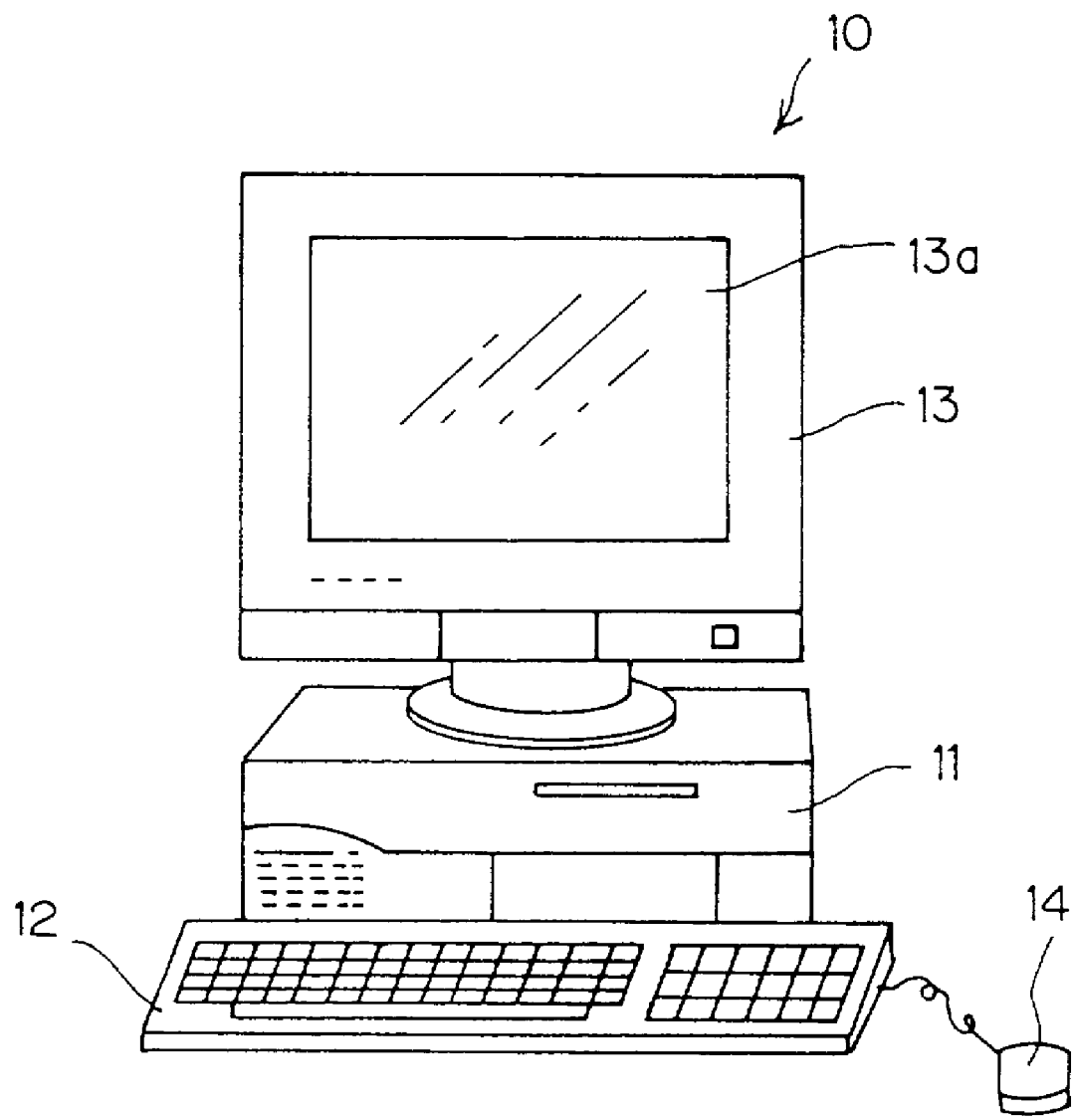
FIG. 5 is a perspective illustration of a kinematic arithmetic apparatus according to one embodiment of the present invention.

FIG. 5 is a perspective illustration of a kinematic arithmetic apparatus according to one embodiment of the present invention.

As shown in FIG. 5, a kinematic arithmetic apparatus 10 according to an embodiment of the present invention is implemented as a computer system comprising a main body 11 incorporated thereinto a CPU (Central Processing Unit), a keyboard 12, a CRT display 13 having a display screen 13a, and a mouse 14. The main body 11 incorporates thereinto, in addition to the CPU, a floppy disk drive which is operative, when a floppy disk (not illustrated) is mounted detachably onto the main body 11, in such a way that data stored in the floppy disk are read out, or data of the inside of the main body 11 are written into the floppy disk, and a hard disk apparatus for storing the data thus read and programs and the like as well. In the CPU, the various sorts of programs are executed. A result is displayed on a display screen 13a of the CRT display 13, or stored in the hard disk and in addition downloaded onto the floppy disk.

The keyboard 12 is used for an input operation of various kinds of instruction to the main body 11. The mouse 14 is an handler for inputting a desired instruction to the main body 11 in such a manner that a cursor displayed on the CRT display 13 is traveled to an optional position on the display screen 13a of the CRT display 13 so as to designate an icon displayed on the display screen 13a.

Figure 6:
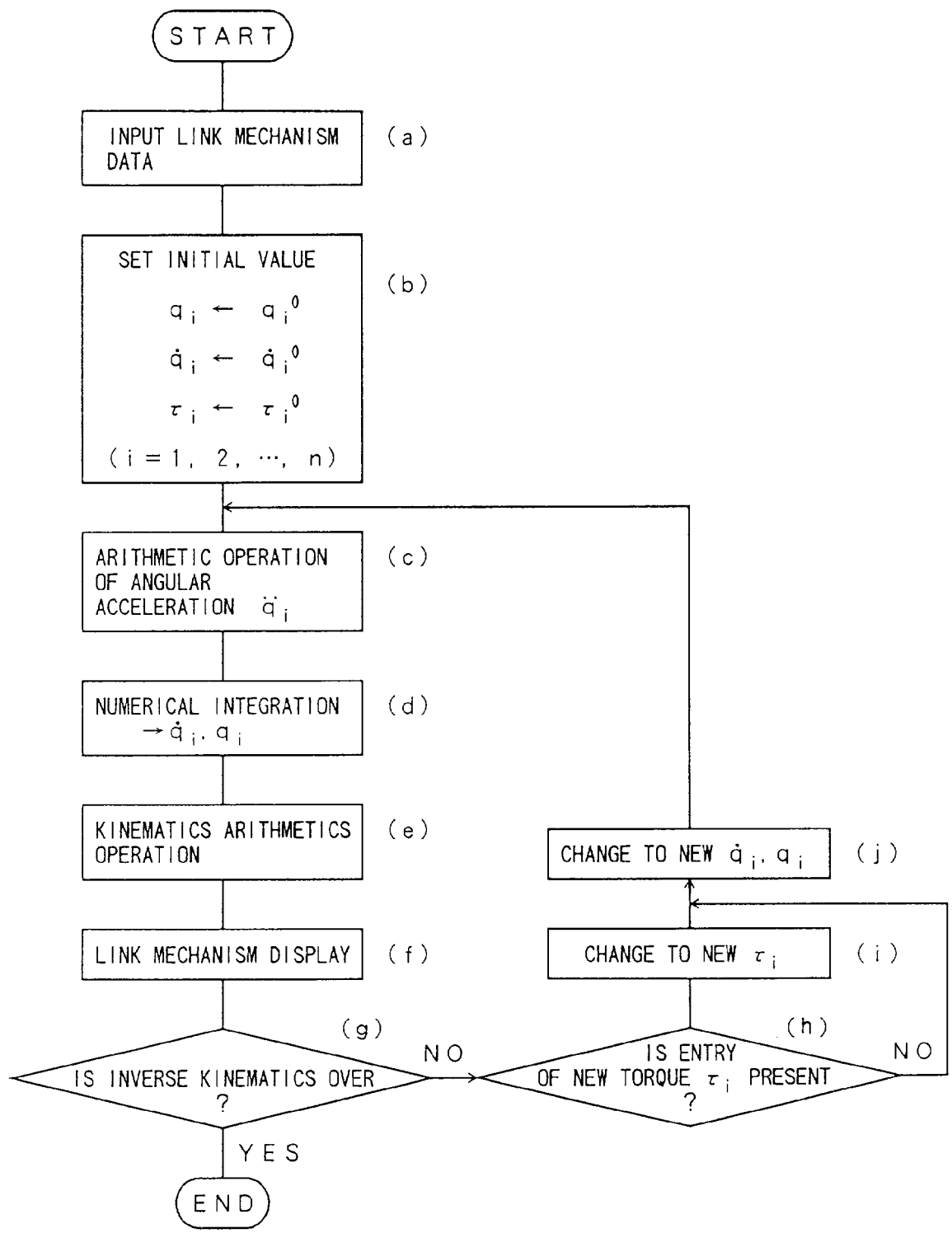
FIG. 6 is a flowchart useful for understanding a kinematic arithmetic method according to the present invention, by way of example, which is executed in the kinematic arithmetic apparatus shown in FIG. 5.

FIG. 6 is a flowchart useful for understanding a kinematic arithmetic method according to the present invention, by way of example, which is executed in the kinematic arithmetic apparatus 10 shown in FIG. 5.

First, a link mechanism as an object to be analyzed is inputted in the form of link mechanism data defined by, for example, D-H parameters (step (a)).

With respect to the D-H parameters, it is well known and thus the explanation will be omitted (cf. "ROBOTICS for mechanical systems" by Shigeki Tohyama, published by Sohgoh Densi Publishing Company).

According to the present embodiment, the link mechanism is defined using a link mechanism defining tool implemented by a computer system, which is different from the kinematic arithmetic apparatus 10 shown in FIG. 5. The link mechanism thus defined is downloaded onto a floppy disk. The floppy disk is mounted on the kinematic arithmetic apparatus 10 shown in FIG. 5 so that the link mechanism data are read in the kinematic arithmetic apparatus 10.

It is acceptable to provide such an arrangement that the kinematic arithmetic apparatus 10 (computer system) shown in FIG. 5 itself generates the link mechanism data by, for example, an interactive processing with an operator. In this case, it is acceptable that a link mechanism defining tool, which is different from the kinematic arithmetic apparatus 10 referenced above, is connected through a communication line to the kinematic arithmetic apparatus 10 referenced above, thereby receiving the link mechanism data via the communication line without passing through the floppy disk. It is not the subject of the present invention as to how the link mechanism data are generated, or as to how the link mechanism data are entered the kinematic arithmetic apparatus. Thus, hereinafter, there will be explained the kinematic arithmetic method on the assumption that the link mechanism data are stored in the kinematic arithmetic apparatus 10 shown in FIG. 5.

Now, the equation of motion defining a motion of n degrees of freedom, that is, n pieces of joint for coupling links, is expressed by $$\ddot{q}_i = \Sigma_j (b_{i,j} \dot{q}_j + k_{i,j} q_j) + \tau_i \qquad (2)$$

where i=1, 2, . . . , n, j=1, 2, . . . , n

In equation (2), $\ddot{q}_i$, $\dot{q}_i$, $q_i$, $\tau_i$ denote an angular acceleration, an angular velocity, an angle, and a torque of the i-th joint, respectively; and $b_{i,j}$ and $k_{i,j}$ denote constants based on the link mechanism data inputted in step (a).

In step (b) in FIG. 6, the initial values $q_i^0$, $\dot{q}_i^0$ and $\tau_i^0$ (i=1, 2, . . . , n) are substituted for the items $q_i$, $\dot{q}_i$ and $\tau_i$ in equation(2), respectively. It is acceptable that those initial values $q_i^0$, $\dot{q}_i^0$ and $\tau_i^0$ (i=1, 2, . . . , n) are stored as part of the link mechanism data, alternatively, they are entered through operations of the keyboard 12 or the mouse 14.

In step (c), the angular accelerations $\ddot{q}_i$ of the respective joints i are evaluated on a numerical basis on the basis of equation (2) in which the initial values are substituted. In step (c), the angular accelerations $\ddot{q}_i$ are sequentially evaluated in accordance with the fashion which will be described later. In step (d), the angular velocities $\dot{q}_i$ of the respective joints i are evaluated by performing the numerical integration (accumulation) for the resultant angular accelerations $\ddot{q}_i$, and the angles $q_i$ of the respective joints i are evaluated by performing the numerical integration (accumulation) for the resultant angular velocities $\dot{q}_i$.

In step (e), a kinematics operation is carried out so that the position and orientation (including those of the tip of the link mechanism) of the link mechanism now on analysis in its entirety are evaluated on the basis of the angles $q_i$ of the respective joints i evaluated on a numerical basis in the fashion as mentioned above and data such as lengths of the respective links.

The kinematic arithmetic apparatus 10 shown in FIG. 5 incorporates thereinto a drawing tool for drawing on the basis of link mechanism data a link mechanism figure typically representative of the structure of the link mechanism. In step (f), the link mechanism figure drawn by the drawing tool and having the position and orientation determined in step (e) is displayed on the display screen 13a of the CRT display 13.

Incidentally, in order to display more realistic link mechanism figure, it is acceptable to provide such an arrangement that link mechanism figure data itself is created beforehand and entered together with the link mechanism data, and the kinematic arithmetic apparatus 10 simply updates the angles of the respective joints i of the link mechanism figure so that the angles of the respective joints i are equal to the angles $q_i$ evaluated in step (d).

At the stage that the link mechanism is displayed on the display screen 13a, it is monitored as to whether instructions by the operator through the keyboard 12 or the mouse 14 is entered.

As one of the instructions, there is an instruction in accordance with which a motion of the link mechanism is stopped at the present stage. When such an instruction is entered, a series of operation is interrupted at the terminated point of time of step (f), and the display screen 13a is kept quite as the link mechanism having the present position and orientation is displayed. It looks like for the operator that the link mechanism temporarily stops on the display screen 13a.

In this manner, the motion of the link mechanism is temporarily stopped, and then the operator enters an instruction such that the inverse kinematics is over, in other word, an instruction such that the tip of the link mechanism reaches a desired target position (step (g)), or an input operation of the new torque $\tau_i$ is carried out (step (h)).

Upon receipt of the instruction such that the inverse kinematics is over, an analysis of the link mechanism is terminated.

If resumption is instructed, while the new torque $\tau_i$ is inputted or not inputted, when the new torque $\tau_i$ is inputted, the torque $\tau_i$ in equation (2) is replaced by the new value entered (step (i)). Further, no matter whether the new torque $\tau_i$ is inputted or not, the angular velocity $q_i$ dot and the angle $q_i$ in equation (2) are replaced by the angular velocity $q_i$ dot and the angle $q_i$ of the joints i which are evaluated immediately before in step (d) (step (j)), and then the process returns to step (c) so as to evaluate the angular accelerations $q_i$ 2 dots of the respective joints i on the basis of equation (2).

Next, there will be explained in detail an arithmetic operation to evaluate the angular accelerations $q_i$ 2 dots in step (c) shown in FIG. 6.

According to the above explanation, while equation (2) is exemplarily shown, indeed, there is adopted Newton's and Euler's equation of motion as set forth below.

$$\tau = M(q) \cdot \ddot{q} + V(q, \dot{q}) + G(q) \tag{3}$$

where $\tau$ is n×1 vectors of torque of a joint,
q is n×1 vectors of angle of a joint,
$\dot{q}$ is n×1 vectors of angular velocity of a joint,
$\ddot{q}$ is n×1 vectors of angular acceleration of a joint,
M (q) is n×n of mass matrix,
V (q, $\dot{q}$) is n×1 vectors representative of items of centrifugal force and Coriolis force, and,
G (q) is n×1 vectors representative of external forces such as gravity and urged force.

A relation between the symbols of the equations (1) and (2) is represented by $$q = \begin{pmatrix} q_1 \\ q_2 \\ \vdots \\ q_i \\ \vdots \\ q_n \end{pmatrix}$$

The Newton's and Euler's equation of motion is the equation of motion representative of a motion of an object of the real world. The use of this equation of motion makes it possible to simulate the actual motion of the object, implement the natural motion of the link mechanism, and prevent an occurrence of the problem of the irregular point.

Incidentally, according to the present embodiment, there is performed the simulation in the kinematic arithmetic apparatus 10 shown in FIG. 5. Thus, with respect to mass and the like of the respective links i, even if there actually exist the corresponding link mechanisms, it is possible to substitute the values which are different from the mass and the like of the actual link mechanisms.

The Newton's and Euler's equation (3) of motion as mentioned above is represented simply by a single equation. On the other hand, if the elements are expressed in its entirety, they would be represented by a very complicated equation. As a result, evaluating the angular acceleration (angular acceleration vector q 2 dots) of the respective joint i through substitution of the numerical values as it is in the form of equation (3) takes a lot of time, and thus it is difficult to smoothly travel the link mechanism on the display screen 13a shown in FIG. 5. For those reasons, as an example of a method of performing at high speed an arithmetic operation for the angular acceleration vector q 2 dots based on the above-mentioned equation (3), hereinafter, there will be explained two techniques one of which is a technique (hereinafter, referred to as an "inverse solution technique") using a recurrence algorithm of the inverse kinetics of Walker & Qrin type and the inverse solution, and another is a technique (hereinafter, referred to as an "forward kinetics technique") using a recurrence algorithm of the forward kinetics of Featherstone.

(inverse solution technique)

In Newton's and Euler's equation of motion as mentioned above, that is, $$\tau = M(q) \cdot \ddot{q} + V(q, \dot{q}) + G(q) \tag{3}$$

first, assuming $$\ddot{q} = (0, 0, \ldots, 0) \tag{4}$$

the inverse kinetics is solved.

For $$\dot{q} = (\dot{q}_1, \dot{q}_2, \ldots \dot{q}_i, \ldots, \dot{q}_n)$$

$$q = (q_1, q_2, \ldots q_i, \ldots, q_n)$$

initial values are substituted. With respect to the solution of the inverse kinetics, it will be described later. The torque $\tau$, which is determined through the arithmetic operation of the inverse kinetics, is represented by $\tau^0$.

The following equations (5)–(7) are represented.

$$\ddot{q} = (1, 0, \ldots, 0) \tag{5}$$

$$\ddot{q} = (0, 1, \ldots, 0) \tag{6}$$

$$\ddot{q} = (0, 0, \ldots, 1) \tag{7}$$

For $$\dot{q} = (\dot{q}_1, \dot{q}_2, \ldots \dot{q}_i, \ldots, \dot{q}_n)$$

$$q = (q_1, q_2, \ldots q_i, \ldots, q_n)$$

the initial values, which are the same as the above, are substituted so as to solve the inverse kinetics. The results of these arithmetic operations are represented by $\tau^1, \tau^2, \ldots, \tau^n$, respectively.

When the following equations are given, $$\Delta \tau^1 = \tau^0 - \tau^1$$

$$\Delta \tau^2 = \tau^0 - \tau^2$$

$$\ldots$$

$$\Delta \tau^n = \tau^0 - \tau^2$$

the angular acceleration vector q 2 dots can be evaluated in accordance with the following equation:

$$\ddot{q}=(\Delta\tau^1,\Delta\tau^2,\ldots,\Delta\tau^n)^{-1}(\tau-\tau^0) \quad (8)$$

where $\tau$ denotes a torque vector as a set of torques of the joints given (inputted through the keyboard 12 or the like). Next, there will be explained the solution of the inverse kinetics. The solution of the inverse kinetics is classified under two cases, one of which relates to a case in which the link mechanism has the fixed edge link, that is, one end (link 0) of the link mechanism is fixed on the ground or the like, and another relates to a case in which the link mechanism has not the fixed edge link, that is, the link mechanism exists in, for example, space.

(A case of having the fixed edge link)

Figure 7:
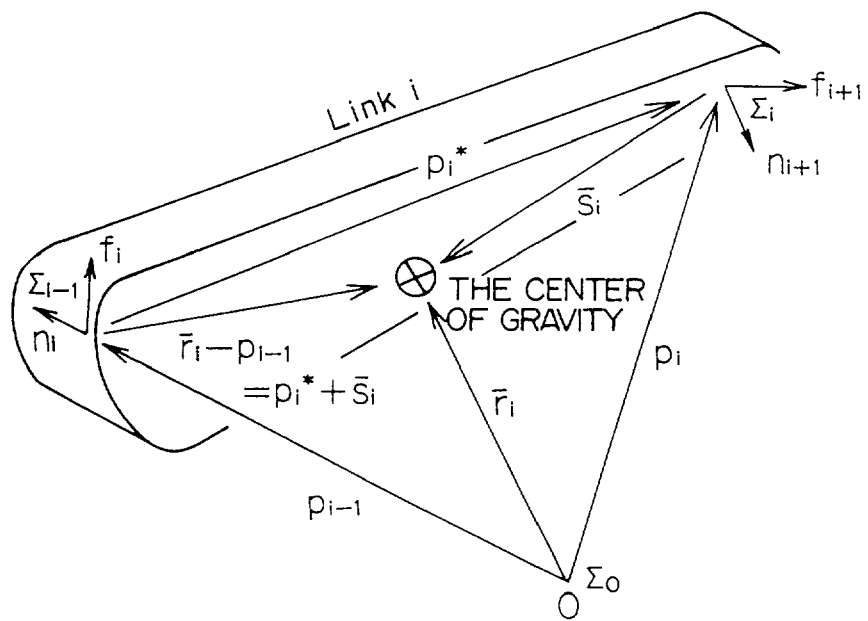
FIG. 7 is an explanatory illustration useful for understanding a notational system.

Here, there are used notational systems shown in FIG. 7 and Table 1.

TABLE 1

| Symbols | Contents |
|---|---|
| $F_i, N_i$ | External force vector acting on link i and moment vector |
| $m_i$ | Mass of link i |
| $I_i$ | Matrix of inertia around the center of gravity represented by coordinate system $\Sigma_0$ |
| $\omega_i, \dot{\omega}_i$ | Vectors of angular velocity and angular acceleration of link i represented by $\Sigma_0$ |
| $\bar{\dot{v}}_i$ | Vector of translation acceleration of the center of gravity of link i (in the text, it is represented by "v, bar dot". This is the similar as to the matter of other symbols.) |
| $f_i, n_i$ | Force and moment acting on link i from link i−1 |
| g | Gravity vector |
| $P_i^*$ | Position vector from the origin of coordinate system $\Sigma_{i-1}$ to the origin of coordinate system $\Sigma_i$, indicated by $\Sigma_i$ |
| $\bar{S}_i$ | Position vector representative of the center of gravity of link i represented by coordinate system $\Sigma i$ |
| $I_i$ | Moment of inertia around the center of gravity of link i represented by coordinate system $\Sigma i$ |
| $R_i$ | 3 × 3 coordinate transformation matrix involved in rotation |
| $b_i$ | Resistance of viscosity of joints |

It is noted that the symbol mark of the bar as in, for example, $\bar{v}_i$ stands for quantity concerning the center of gravity (for example, $\bar{\dot{v}}_i$ denotes vector of translation acceleration of the center of gravity of link i), and one having no bar, for example, $\dot{v}_i$ stands for quantity concerning the origin of coordinate system $\Sigma_i$ (for example; $v_i$ denotes vector of translation acceleration of the origin of $\Sigma_i$).

In the following equations, for example, (i) of $\omega_i^{(i)}$ stands for quantity looking at the coordinate system $\Sigma_i$. Further, (R) and (S) stand for the case of rotary joints and the case of direct acting joints, respectively.

In the case of having the fixed edge link, the inverse solution, in which the following equation is given $$\ddot{q} = \begin{pmatrix} \ddot{q}_1 \\ \ddot{q}_2 \\ \vdots \\ \ddot{q}_i \\ \vdots \\ \ddot{q}_n \end{pmatrix} \quad (9)$$

to evaluate the equation as set forth below, $$\tau = \begin{pmatrix} \tau_1 \\ \tau_2 \\ \vdots \\ \tau_i \\ \vdots \\ \tau_n \end{pmatrix}$$

is formulated, using the notational systems shown in FIG. 7 and Table 1, as follows.

Step 0: Initialization $\omega_0 = \dot{\omega}_0 = 0$ $\dot{v}_0 = g = (g_x, g_y, g_z)$ $z_o = (0, 0, 1)$ Step 1: Forward routine (a routine for proceeding with operation in the order of i=1, 2, ..., n)

$\omega_i^{(i)} = R_i^T(\omega_{i-1}^{(i-1)} + z_0 \dot{q}_i)(R)$ $\quad R_i^T \omega_{i-1}^{(i-1)}(S)$ $\dot{\omega}_i^{(i)} = R_i^T(\dot{\omega}_{i-1}^{(i-1)} + z_0 \ddot{q}_i + \omega_{i-1}^{(i-1)} + z_0 \dot{q}_i)(R)$ $\quad R_i^T \dot{\omega}_{i-1}^{(i-1)}(S)$ $\dot{v}_i^{(i)} = \dot{\omega}_i^{(i)} \times p_i^* + \omega_i^{(i)} \times (\omega_i^{(i)} \times p_i^*) + R_i^T \dot{v}_{i-1}^{(i-1)}(R)$ $\quad R_i^T(z_0 \ddot{q}_i + \dot{v}_{i-1}^{(i-1)}) + \dot{\omega}_i^{(i)} \times p_i^* + 2\omega_i^{(i)} \times (R_i^T z_0 \dot{q}_i) +$ $\quad \omega_i^{(i)} \times (\omega_i^{(i)} \times p_i^*)(S)$ $\bar{\dot{v}}_i^{(i)} = \dot{\omega}_i^{(i)} \times \bar{s}_i^{(i)} + \omega_i^{(i)} \times (\omega_i^{(i)} \times \bar{s}_i^{(i)}) + \dot{v}_i^{(i)}$ $F_i^{(i)} = m_i \bar{\dot{v}}_i^{(i)}$ $N_i^{(i)} = I_i \dot{\omega}_i^{(i)} + \omega_i^{(i)} \times I_i \omega_i^{(i)}$ Step 2: Backward routine (a routine for proceeding with operation in the order of i=n, n−1, ..., 1)

$f_i^{(i)} = R_{i+1} f_{i+1}^{(i+1)} + F_i^{(i)}$ \quad (10)

$n_i^{(i)} = R_{i+1} n_{i+1}^{(i+1)} + p_i^* \times R_{i+1} f_{i+1}^{(i+1)} \times F_i^{(i)} + N_i^{(i)} +$ $\quad (p_i^* + \bar{s}_i^{(i)})$ $\tau_i = n_i^{(i)} R_i^T z_0 + b_i \dot{q}_i (R)$ $\quad f_i^{(i)} R_i^T z_0 + b_i \dot{q}_i (S)$ In accordance with this algorithm, arithmetic operation is carried out up to equation (10). Thus, from the initial values of $\ddot{q}, \dot{q}, q,$ the torque vector $\tau$ is evaluated in the form of the set of $\tau_i$.

(A case of not having the fixed edge link)

Figure 8:
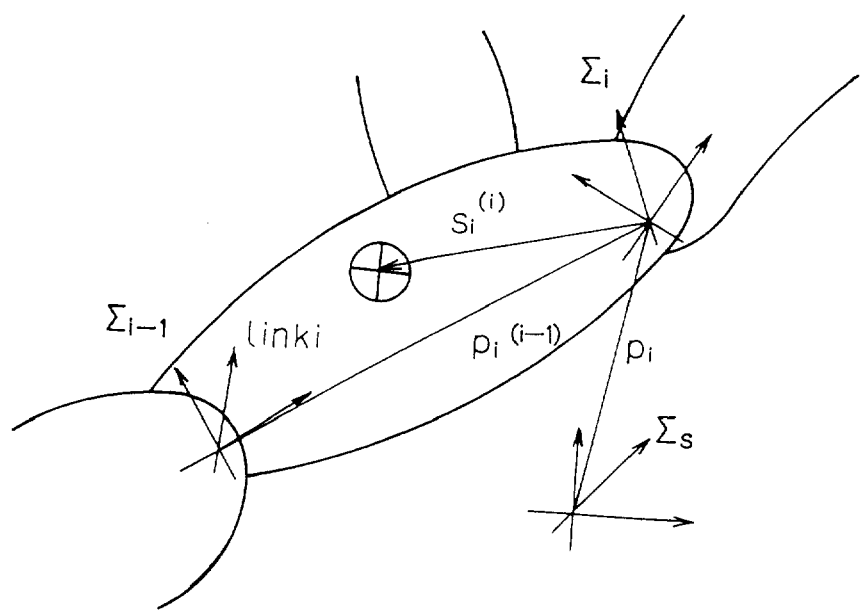
FIG. 8 is another explanatory illustration useful for understanding a notational system.

In this case, there are used notational systems shown in FIG. 8 and Tables 2, 3 and 4.

TABLE 2

| Symbols | Contents |
|---|---|
| $b_i$ | Resistance of viscosity of joint i |
| $I_i$ | Moment of inertia around the center of gravity of link i represented by coordinate system $\Sigma_i$ |
| L | Total angular momentum of a robot |
| n | Number of links of a manipulator of a robot, and number of joints thereof |

TABLE 2-continued

| Symbols | Contents |
|---|---|
| $m_i$ | Mass of link i |
| $N_i^{(j)}, F_i^{(j)}$ | Torque and force acting on the center of gravity of link i represented by coordinate system$\Sigma_j$ |
| $n_i^{(j)}, f_i^{(j)}$ | Components, affected by a movement of the main body of a robot, of torque and force acting on the center of gravity of link i represented by coordinate system $\Sigma_j$ |
| $P_i$ | Vector from the origin of coordinate system $\Sigma_s$ to the origin of coordinate system$\Sigma_i$, indicated by coordinate system$\Sigma_s$ |
| $P_i^j$ | Vector from the origin of coordinate system $\Sigma_j$ to the origin of coordinate system$\Sigma_i$, indicated by coordinate system$\Sigma_i$ |
| Q | Total momentum of a robot |
| $q_i, \dot{q}_i, \ddot{q}_i$ | Angle, angular velocity and angular acceleration of joint i (in case of the rotary type of joint), or displacement, velocity and acceleration of joint i (in case of the direct acting type of joint) |
| $R_i$ | Coordinate transformation matrix from coordinate system$\Sigma_i$ to coordinate system$\Sigma_s$ [Caution] 3 x 3 involved in only rotation |
| $R_i^j$ | Coordinate transformation matrix from coordinate system$\Sigma_i$ to coordinate system$\Sigma_j$ [Caution] 3 x 3 involved in only rotation |

TABLE 3

| Symbols | Contents |
|---|---|
| $r_i$ | $= (x_i, y_i, z_i)^T = P_i + S_i$ |
| $S_i$ | Vector from the origin of coordinate system $\Sigma_i$ to the center of gravity of link i, indicated by coordinate system $\Sigma_s$ |
| $S_i^j$ | Vector from the origin of coordinate system $\Sigma_i$ to the center of gravity of link i, indicated by coordinate system $\Sigma_j$ |
| $u_i^{(j)}$ | Components, independent of a movement of the main body of a robot, of acceleration of the position of the center of gravity of link i represented by coordinate system $\Sigma_j$ |
| $V_0, \Omega_0$ | Velocity and angular velocity, at the origin of the coordinate system $\Sigma_s$, of link 0 represented by the coordinate system$\Sigma_s$ |
| $v_i^{(j)}, \omega_i^{(j)}$ | Components, independent of a movement of the main body of a robot, of velocity and angular velocity of link i represented by coordinate system$\Sigma_j$ |
| $A_0, \Gamma_0$ | Acceleration and angular acceleration, at the origin of the coordinate system $\Sigma_s$, of link 0 represented by the coordinate system $\Sigma_s$ |
| $\alpha_i^{(j)}, \gamma_i^{(j)}$ | Components, independent of a movement of the main body of a robot, of acceleration and angular acceleration of link i represented by coordinate system$\Sigma_j$ |
| $\Sigma_i$ | Coordinate system movable together with link i |
| $\Sigma_s$ | Static (inertia) coordinate system |
| $\sigma_i$ | Kind of joints = 1 (the case of a rotary type of joint) 0 (others) |
| $\bar{\sigma}_i$ | Kind of joints = 1 (the case of a direct acting type of joint) 0 (others) |

TABLE 4

| Symbols | Contents |
|---|---|
| $\tau_i^j$ | Force acting on joint i |
| $\tau_i^n$ | Torque acting on joint i |
| $\tau_i$ | Torque/force necessary for driving joint i |

TABLE 4-continued

| Symbols | Contents |
|---|---|
| $\Omega_i^{(j)}$ | Angular velocity, at the origin of the coordinate system, of link i represented by the coordinate system$\Sigma_j$ |
| T | Transposed matrix |

In a similar fashion to that of Table 1, the symbol mark of the bar stands for a quantity involved in the center of gravity, and the mark (i) is representative of a quantity looking at the coordinate system $\Sigma_i$.

In case of not having the fixed edge link, the inverse solution, in which q 2 dots (cf. equation (9)) is given to evaluate the torque vector τ, is formulated, using the notational systems shown in FIG. 8 and Tables 2, 3 and 4, as follows.

Step 0: Set constants and initial values $z \leftarrow (0, 0, 1)^T$ $\omega_0^{(0)} \leftarrow 0$ $v_0^{(0)} \leftarrow 0$ $\bar{v}_0^{(0)} \leftarrow 0$ $\gamma_0^{(0)} \leftarrow 0$ $q_0 \leftarrow 0$ $P_0 \leftarrow$ initial position $R_0 \leftarrow$ initial orientation $M \leftarrow m_0$ $\bullet A_{12} \leftarrow m_0 \begin{bmatrix} 0 & z_0 & -y_0 \\ -z_0 & 0 & x_0 \\ y_0 & -x_0 & 0 \end{bmatrix}$ $A_{22} \leftarrow R_0 I_0 R_0^T$ $\bullet A_{22} \leftarrow R_0 I_0 R_0^T + m_0 \begin{bmatrix} y_0^2 + z_0^2 & -x_0 y_0 & -x_0 z_0 \\ -y_0 x_0 & z_0^2 + x_0^2 & -y_0 z_0 \\ -z_0 x_0 & -z_0 y_0 & x_0^2 + y_0^2 \end{bmatrix}$ Step 1: Forward routine 0 (0<i)

$\bullet M \leftarrow M + m_i$ $\bullet R_i^{i-1} \leftarrow \begin{bmatrix} C_{\theta i} & -S_{\theta i} C_{\phi i} & S_{\theta i} C_{\phi i} \\ S_{\theta i} & C_{\theta i} C_{\phi i} & -C_{\theta i} S_{\phi i} \\ 0 & S_{\phi i} & C_{\phi i} \end{bmatrix}$ $\bullet P_i^{i-1} \leftarrow R_i^{i-1} (\sigma_i a_i C_{\theta i}, \sigma_i a_i S_{\theta i}, d_i)^T$ $\bullet R_i \leftarrow R_{i-1} R_i^{i-1}$ $\bullet P_i \leftarrow P_{i-1} + R_i P_i^{i-1}$ $\bullet s_i \leftarrow R_i s_i^{(i)}$ $\bullet r_i \leftarrow P_i + s_i$ $\bullet A_{12} \leftarrow A_{12} + m_i \begin{bmatrix} 0 & z_i & -y_i \\ -z_i & 0 & x_i \\ y_i & -x_i & 0 \end{bmatrix}$ -continued $$\bullet A_{22} \leftarrow A_{22} + R_i I_i R_i^T + m_0 \begin{bmatrix} y_i^2 + z_i^2 & -x_i y_i & -x_i z_i \\ -y_i x_i & z_i^2 + x_i^2 & -y_i z_i \\ -z_i x_i & -z_i y_i & x_i^2 + y_i^2 \end{bmatrix}$$

Step 2.1: Set the initial value of forward routine $$A_{11} \leftarrow \begin{bmatrix} M & 0 & 0 \\ 0 & M & 0 \\ 0 & 0 & M \end{bmatrix}$$

$b_v \leftarrow Q$ $b_\omega \leftarrow L$

Step 2.2: Forward routine 0 (0<i)

$\omega_i^{(i)} \leftarrow R_i^{i-1}(\omega_{i-1}^{(i-1)} + \sigma_i z \dot{q}_{i-1})$ $v_i^{(i)} \leftarrow \omega_i^{(i)} \times P_i^{i-1} + R_i^{i-1}(\bar{\sigma}_i z \dot{q}_{i-1} + v_{i-1}^{(i-1)})$ $\bar{v}_i^{(i)} \leftarrow \omega_i^{(i)} \times s_i + v_i^{(i)}$ $b_v \leftarrow b_v - R_i m_i \bar{v}_i^{(i)}$ $b_\omega \leftarrow b_\omega - \{R_i I_i \omega_i^{(i-r)} \times R_i m_i \bar{v}_i^{(i)}\}$ Step 2.3: Determination of velocity and angular velocity of link 0

$$\begin{bmatrix} V_0 \\ \Omega_0 \end{bmatrix} \leftarrow \begin{bmatrix} A_{11} & A_{12} \\ -A_{12} & A_{22} \end{bmatrix}^{-1} \begin{bmatrix} b_v \\ b_\omega \end{bmatrix}$$

Step 3.1: Set the initial value of the forward routine 2

$\Omega_0^{(0)} \leftarrow R_0^\tau \Omega_0$ $\alpha_0^{(0)} \leftarrow R_0^\tau \{\Omega_0 \times (V_0 + \Omega_0 \times P_0)\}$ $u_0^{(0)} \leftarrow R_0^\tau \{\Omega_0 \times (\Omega_0 \times s_0)\} + \alpha_0^{(0)}$ $n_0^{(0)} \leftarrow \Omega_0^{(0)} \times I_0 \Omega_0^{(0)} \cdot f_0^{(0)} \leftarrow m_0 u_0^{(0)}$ $b_\alpha \leftarrow -R_b f_0^{(0)}$ $b_\gamma \leftarrow -\{R_0 n_0^{(0)} + r_0 \times (R_0 f_0^{(0)})\}$ Step 3.2: Forward routine 2 (0<i)

$\Omega_i^{(i)} \leftarrow \omega_i^{(i)} + R_i^\tau \Omega_0$ $\gamma_i^{(i)} \leftarrow R_i^{i-1\tau} \{\gamma_{i-1}^{(i-1)} + \sigma_i(z\dot{q}_{i-1} + \Omega_{i-1}^{(i-1)} \times z\dot{q}_{i-1})\}$ $\alpha_i^{(i)} \leftarrow \gamma_i^{(i)} \times P_i^{i-1} + \Omega_i^{(i)} \times (\Omega_i^{(i)} \times P_i^{i-1}) +$
$\qquad 2\bar{\sigma}_i \Omega_i^{(i)} \times (R_i^{i-1} z \dot{q}_{i-1}) + R_i^{i-1T}(\bar{\sigma}_i z \ddot{q}_{i-1} + \alpha_{i-1}^{(i-1)})$ $u_i^{(i)} \leftarrow \gamma_i^{(i)} \times s_i + \Omega_i^{(i)} \times (\Omega_i^{(i)} \times s_i) + \alpha_i^{(i)}$ $n_i^{(i)} \leftarrow I_i \gamma_i^{(i)} + \Omega_i^{(i)} \times I_i \Omega_i^{(i)}$ $f_i^{(i)} \leftarrow m_i u_i^{(i)}$ $b_\alpha \leftarrow b_\alpha - R_i f_i^{(i)}$ $b_\gamma \leftarrow b_\gamma - \{R_i n_i^{(i)} + n_i \times (R_i f_i^{(i)})\}$ Step 3.3: Determination of acceleration and angular acceleration of link 0

$$\begin{bmatrix} A_0 \\ \Gamma_0 \end{bmatrix} \leftarrow \begin{bmatrix} A_{11} & A_{12} \\ -A_{12} & A_{22} \end{bmatrix}^{-1} \begin{bmatrix} b_\alpha \\ b_\gamma \end{bmatrix}$$

Step 4.1: Backward routine 1

$N_i^{(i)} \leftarrow n_i^{(i)} + I_i R_i^\tau T_0$ $F_i^{(i)} \leftarrow f_i^{(i)} + m_i R_i^\tau (A_0 + \Gamma_0 \times \Gamma_i)$ $\tau_i^f \leftarrow (0,0,0)^\tau$ $\tau_i^n \leftarrow (0,0,0)^\tau$ Step 4.2: Backward routine 2 (0<i)

$\tau_{i-1}^f \leftarrow \tau_{i-1}^f + R_i^{i-1} \tau_i^f + F_i^{(i)}$ $\tau_{i-1}^n \leftarrow \tau_{i-1}^n + R_i^{i-1} \tau_i^n + R_i^{i-1}(P_i^{i-1} \times \tau_i^f) + (P_i^{i-1} \times s_i^{(i)}) \times F_i^{(i)+N_i^{(i)}}$ Step 4.3: Backward routine 3 (0<i)

$\tau_i \leftarrow \sigma_i \tau_i^n z + \bar{\sigma}_i \tau_i^f z + b_i \dot{q}_i$ \hfill (11)

In accordance with the above-mentioned algorithm, arithmetic operation is carried out up to equation (11). Thus, from the initial values of q 2 dots, q dot, and q, the torque vector τ is evaluated in the form of the set of $\tau_i$.

(Forward kinetics technique)

The angular acceleration vector q 2 dots is directly evaluated in such a way that in the above-mentioned Newton's and Euler's equation of motion, that is, $$\tau = M(q)\ddot{q} + V(q,\dot{q}) + G(q) \qquad (3)$$

the torque vector τ is given. Also in this case, it is classified into two conditions one of which is directed to a case in which the link mechanism has a fixed edge link (link 0), and another is directed to a case in which the link mechanism does not have a fixed edge link (link 0).

(A case of having the fixed edge link)

Here, again, the notational systems of FIG. 7 and Table 1 are adopted.

Step 0: Initialization $\omega_0 = \dot{\omega}_0 = 0$ $\dot{v}_0 = g = (g_x, g_y, g_z)$ $z_0 = (0, 0, 1)$ Step 1: Forward routine (i=1, 2, . . . , n)

$\omega_i^{(i)} = R_i^\tau(\omega_{i-1}^{(i-1)} + z_0 \dot{q}_i)$ \hfill (R)

$R_i^T \omega_{i-1}^{(i-1)}$ \hfill (S)

Step 2.1: Initialization of backward routine $$M_n^{(n)} = \begin{bmatrix} m_n & -m_n \bar{s}_n^{(n)} \times \\ m_n(p_n^* + \bar{s}_n^{(n)}) \times & I_n - m_n(p_n^* + \bar{s}_n^{(n)}) \times (\bar{s}_n^{(n)}) \end{bmatrix}$$

$$C_n^{(n)} = \begin{bmatrix} m_n \omega_n^{(n)} \times (\omega_n^{(n)} \times \bar{s}_n^{(n)}) + f_{n+i} \\ m_n(p_n^* + \bar{s}_n^{(n)}) \times [\omega_n^{(n)} - (\omega_n^{(n)} + \bar{s}_n^{(n)}) + \\ p_n^* \times f_{n+1} + n_{n+1} + \omega_n^{(n)} \times (I_n \omega_n^{(n)}) \end{bmatrix}$$

where $$m_n = \begin{bmatrix} m_n & 0 & 0 \\ 0 & m_n & 0 \\ 0 & 0 & m_n \end{bmatrix} : 3 \times 3 \text{ matrix}$$

$$r \times \equiv \begin{bmatrix} 0 & -r_z & r_y \\ r_z & 0 & -r_x \\ -r_y & r_x & 0 \end{bmatrix}$$

$$f_{n+1} = n_{n+1} \equiv 0$$

$M_n^{(n)} : 6 \times 6 \text{ matrix}$ $C_n^{(n)} : 6 \times 1 \text{ vector}$

Step 2.2: Backward routine (i=n, n−1, . . . , 1)

$$M_i^{(i)} = \hat{M}_i^{(i)} + \hat{T}_i^{(i)} R_{i+1} M_{i+1}^{(i+1)} W_{i+1} - \frac{\hat{T}_i^{(i)} R_{i+1} M_{i+1}^{(i+1)} Q_{i+1}^{(i+1)} \cdot (R_i \sigma_i)^T M_{i+1}^{(i+1)} W_{i+1}}{(R_i \sigma_i)^T \cdot M_{i+1}^{(i+1)} Q_{i+1}^{i+1}}$$

$$C_i^{(i)} = \frac{\tau_{i+1} \hat{T}_i^{(i)} R_{i+1} M_{i+1}^{(i+1)} Q_{i+1}^{(i+1)} - \hat{T}_i^{(i)} R_{i+1} M_{i+1}^{(i+1)} Q_{i+1}^{(i+1)} (R_i \sigma_i)^T \cdot (M_{i+1}^{(i+1)} Y_{i+1}^{(i+1)} C_{i+1}^{(i+1)})}{(R_i \sigma_i)^T M_{i+1}^{(i+1)} Q_{i+1}^{i+1}} +$$

$$T_i^{(i)} R_{i+1} (M_{i+1}^{(i+1)} Y_{i+1}^{(i+1)} + C_{i+1}^{(i+1)}) + \hat{C}_i^{(i)}$$

where $$M_i^{(i)} = \begin{bmatrix} m_i & -m_i \bar{s}_i^{(i)} \times \\ m_i(p_i^* + \bar{s}_i^{(i)}) \times & I_i - m_i(p_i^* + \bar{s}_i^{(i)}) \times (\bar{s}_i^{(i)}) \end{bmatrix}$$

$$\hat{T}_i^{(i)} = \begin{bmatrix} k & 0 \\ p_i^* \times & k \end{bmatrix}$$

tetël $k = \begin{bmatrix} 1 & 0 & 0 \\ 0 & 1 & 0 \\ 0 & 0 & 1 \end{bmatrix}$ $$\hat{C}_i^{(i)} = \begin{bmatrix} m_i \omega_i^{(i)} \times (\omega_i^{(i)} \times \bar{s}_i^{(i)}) \\ m_i(p_i^* + \bar{s}_i^{(i)}) \times [\omega_i^{(i)} \times (\omega_i^{(i)} + \bar{s}_i^{(i)})] + \\ \omega_i^{(i)} \times (I_i \omega_i^{(i)}) \end{bmatrix}$$

Step 3.1: Initialization of forward routine $$W_{i+1} = \begin{bmatrix} k & -p_{i+1}^* \\ 0 & k \end{bmatrix} \quad (12)$$

-continued $$Q_{i+1} = \begin{bmatrix} z \times p_{i+1}^* \\ z \end{bmatrix} (R)$$

$$= \begin{bmatrix} z \\ 0 \end{bmatrix} \quad (S)$$

$$Y_{i+1} = \begin{bmatrix} \dot{q}_{i+1}(\omega_i^{(i)} \times z) \times p_{i+1}^* + \omega_{i+1}^{(i+1)} \times \\ (\omega_{i+1}^{(i+1)} \times p_{i+1}^*) \\ \dot{q}_{i+1} \omega_i \times z \end{bmatrix} (R)$$

$$= \begin{bmatrix} 2\dot{q}_{i+1} \omega_{i+1}^{(i+1)} \times z + \omega_{i+1}^{(i+1)} \times (\omega_{i+1}^{(i+1)} \times p_{i+1}^*) \\ 0 \end{bmatrix} (S)$$

$$\sigma_i = \begin{bmatrix} z \\ 0 \end{bmatrix} (R)$$

$$= \begin{bmatrix} 0 \\ z \end{bmatrix} (S)$$

$$\alpha_0^{(0)} = 0$$

Step 3.2: Forward routine (i=1, 2, . . . , n)

$$\tau_i - (R_{i-1} \sigma_{i-1})^T M_i^{(i)} W_i^{(i)} (R_{i-1}) \alpha_{i-1}^{(i-1)} - \qquad (13)$$

$$\ddot{q}_i = \frac{(R_{i-1} \sigma_{i-1}) M_i^{(i)} Y_i^{(i)} - (R_{i-1} \sigma_{i-1})^T C_i^{(i)}}{(R_{i-1} \sigma_{i-1})^T M_i^{(i)} Q_i^{(i)}}$$

$$\alpha_i^{(i)} = W_i^{(i)} (R_{i-1}) \alpha_{i-1}^{(i-1)} + Q_i^{(i)} \ddot{q}_i + Y_i^{(i)}$$

In accordance with the above-mentioned algorithm, arithmetic operation is carried out up to equation (13). Thus, from the torque vector τ, the angular acceleration vector q 2 dots is evaluated.

(A case of not having the fixed edge link)

Here, again, the notational systems of FIG. 8 and Table 2 are adopted.

First, starting from step 0 of the algorithm in case of not having the fixed edge link as mentioned above, the process is progressed up to step 2.3 to evaluate velocity $V_0$ and angular velocity $\Omega_0$ of the link 0.

Next, step 2.1 et seqq. in case of not having the fixed edge link in the forward kinetics technique is carried out. Now, in step 2.1 et seqq., in order to match the notational system, it is assumed that p* is replaced by $P_i$;

$\bar{s}_i^{(i)}$ is replaced by $s_i^{(i)}$; and the above-mentioned equation (12) is replaced by $$\alpha_0^{(0)} = M_0^{(0)-1} C_0^{(0)} \qquad (14)$$

Execution of the above-mentioned algorithm makes it possible to evaluate angular acceleration vector q 2 dots in accordance with the forward kinetics technique, even in case of not having the fixed edge link.

In the above-mentioned examples, it is assumed that the joint torque τ is inputted through operation of the keyboard 12 or the mouse 14 by the operator. However, it is acceptable that instead of inputting the joint torque τ by the operator, the operator inputs the target position of a certain point (e.g. the tip ) on the link mechanism so as to generate a torque corresponding to the distance between the target position and the current position, and the torque thus generated is dealt with equivalence to the joint torque τ by the operator. In this case, for step (h) in FIG. 6, there is a step in which the joint torque τ is generated in accordance with, for example, the following equation (15)

$$\tau = A \cdot (P - P_0) \tag{15}$$

where A: A suitable matrix in which angle vector q is dealt with variables
$P_0$: The current position vector of the tip of the link mechanism
P: The target position vector And in step (i), the torque is updated with the joint torque τ generated in accordance with equation (15).

This arrangement makes it possible to save the operator's trouble for entering the joint torque.

According to the above-mentioned examples, while the torque vector τ is given to evaluate the respective acceleration vectors q 2 dots, it is acceptable to give the torque vector τ and in addition to vary force and moment acting on the link. With respect to varying force and moment acting on the link, in equation (2), varying $k_{i,j}$ corresponds to it; in the notational system of Table 1, varying $F_i$, $N_i$ corresponds to it; and in the notational systems of Tables 2–4, varying $F_i^{(j)}$, $N_i^{(j)}$ corresponds to it.

In order to cause the force and moment to act on the link, it is acceptable that an operator designates, through operation of the keyboard 12 or the mouse 14 by the operator, a link on which the force and moment act, a point to which the force on the link is applied, a direction in which the force is applied, and a magnitude of the force to be applied. However, it is convenient to adopt a technique wherein an imaginary object is disposed in an imaginary space in which the link mechanism is arranged.

Figure 9:
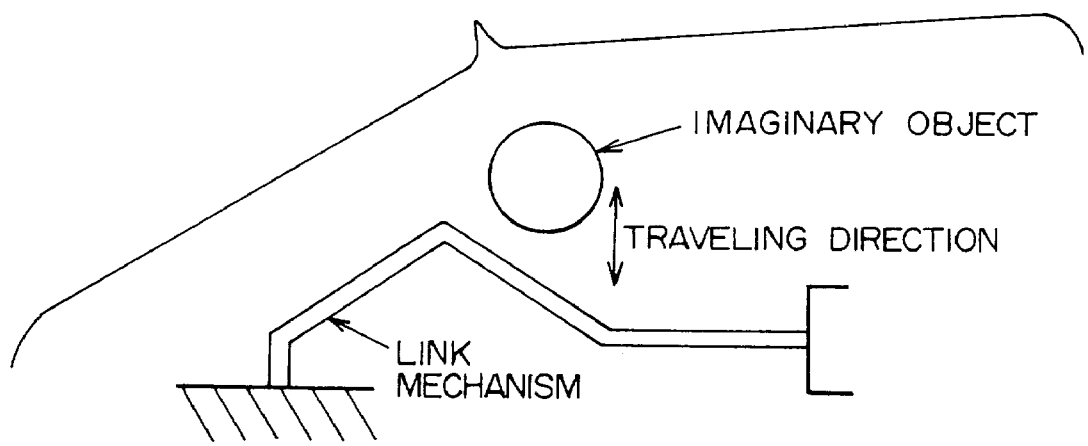
FIG. 9 is a typical illustration showing a state that an imaginary object is disposed in an imaginary space in which a link mechanism is arranged.
Figure 10:
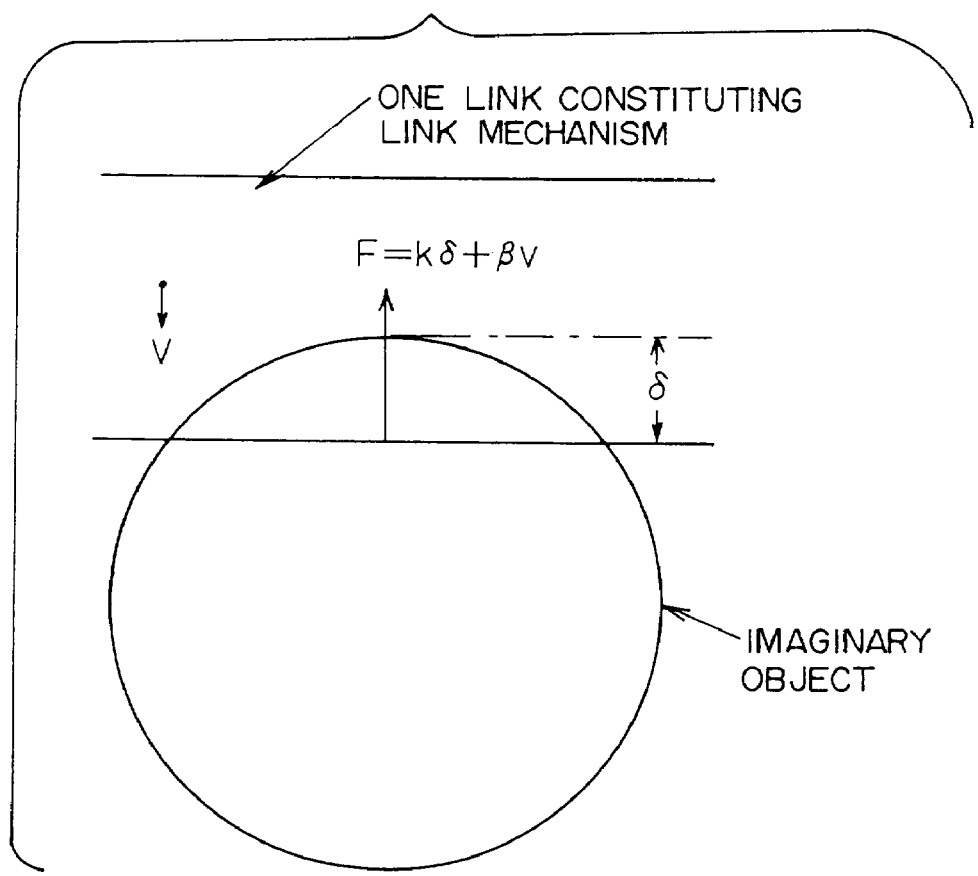
FIG. 10 is a typical illustration showing a state that one link constituting a link mechanism interferes with an imaginary object.

FIG. 9 is a typical illustration showing a state that an imaginary object is disposed in an imaginary space in which a link mechanism is arranged. FIG. 10 is a typical illustration showing a state that one link constituting a link mechanism interferes with an imaginary object.

It is assumed that as shown in FIG. 9, an imaginary object is disposed within a traveling limit of the link mechanism and the link mechanism is moved, and a certain one link constituting the link mechanism and the imaginary object interferes with one another by interference amount δ with the relative velocity v therebetween. In this case, the interference force F is generated in accordance with, for example, equation (16) represented by:

$$F = k\delta + \beta v \tag{16}$$

where k and β denote constants

And, the force F and the moment N induced by the force F are reflected on the arithmetic operation.

Adoption of this technique permits an operator to determine the inverse kinematics while monitoring the redundancy of the manipulator. Further, according to adoption of this technique, the imaginary object serves to vary the force and the moment which act on the link, and thus it is possible to save an operator's trouble for input one by one the force and the moment which act on the link.

Figure 11:
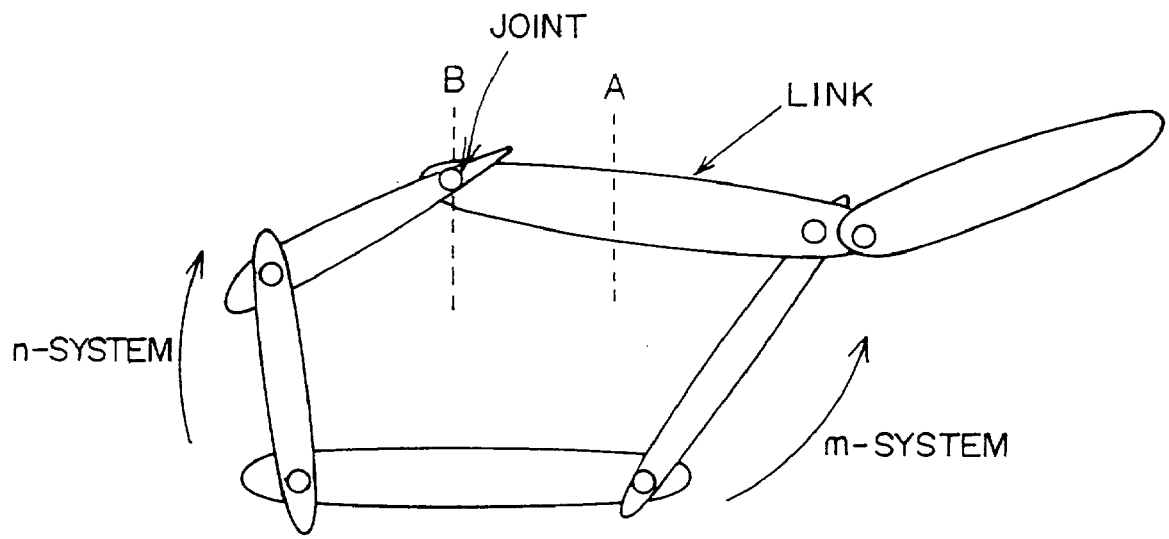
FIG. 11 is a typical illustration of a link mechanism having a closed loop.

FIG. 11 is a typical illustration of a link mechanism having a closed loop.

In this case, assuming that the closed loop is cut at a certain place, the constraint conditions at the cut point are is appended in the form of the force and the moment. This permits the foregoing arithmetic operation scheme to be adopted as it is.

Here, there will be explained a case in which a link is cut halfway along a broken line A, and a case in which a link is cut at a position of the joint along a broken line B.

(A Case of cutting halfway of links)

In this case, as the constraint conditions, there are considered conditions such that the force and the moment proportional to a displacement of the position and orientation of the cutting portion, and the force and the moment proportional to the relative velocity and angular velocity occur.

For example, considering the n-system and m-system, it is assumed that the force and the moment in the n-system are represented by $f_{n+1}$ and $n_{n+1}$, respectively, and the force and the moment in the m-system are represented by $f_{m+1}$ and $n_{m+1}$, respectively. Now, the following equations are given.

$$f_{n+1} = A_f^n (P_n - P_m)$$
$$n_{n+1} = A_n^n (P_n - P_m)$$
$$f_{m+1} = A_f^m (P_n - P_m)$$
$$n_{m+1} = A_n^m (P_n - P_m)$$

where $A_f^n$, $A_n^n$, $A_f^m$ and $A_n^m$ denote constants Thus, the respective acceleration vectors q 2 dots may be evaluated in accordance with, for example, the above-mentioned forward kinetics technique.

(A case of cutting at the position of joints)

If it is supposed that the joint is directly cut, this technique cannot be applied. For this reason, it is supposed that there exists an imaginary link having length 0 at the position of the joint, and the imaginary link is cut.

Figure 12:
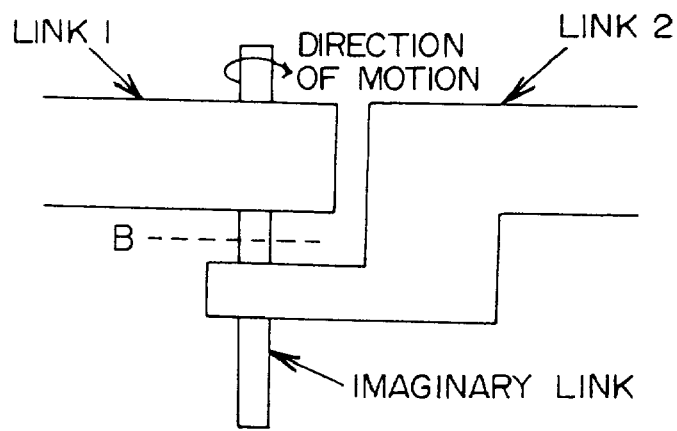
FIG. 12 is an illustration showing a state that an imaginary link is supposed at the position of a rotary type of joint, and the imaginary link is cut.
Figure 13:
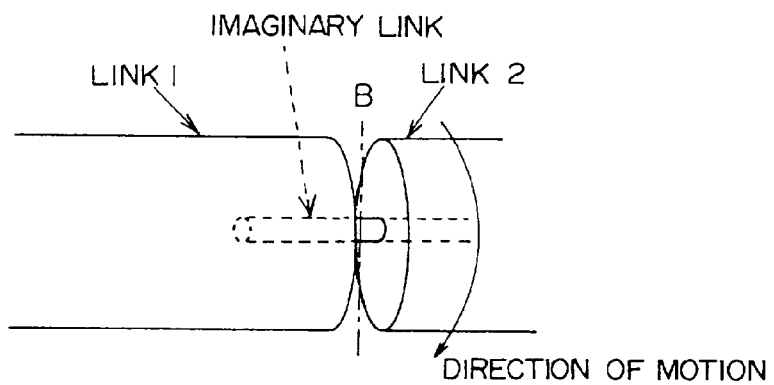
FIG. 13 is an illustration showing a state that an imaginary link is supposed at the position of a rotary type of joint, and the imaginary link is cut.
Figure 14:
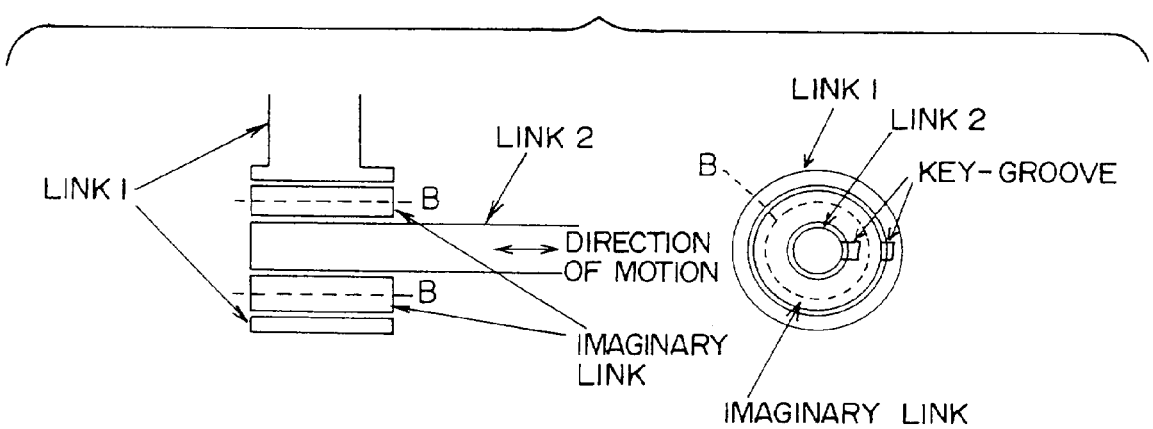
FIG. 14 is an illustration showing a state that an imaginary link is supposed at the position of a direct acting type of joint, and the imaginary link is cut.

FIGS. 12–14 are each an illustration showing a state that an imaginary link is supposed at the position of a joint, and the imaginary link is cut. Specifically, each of FIGS. 12 and 13 shows an example in which an imaginary link is supposed at the position of a rotary type of joint, and the imaginary link is cut. FIG. 14 shows an example in which an imaginary link is supposed at the position of a direct acting type of joint, and the imaginary link is cut.

As apparent from those example, it is possible to substantially cut an open loop at the position of the joint by replacement of the cut of the position of the joint by the cut of the link.

As described above, according to the present invention, it is possible to implement a natural motion of the link mechanism involving the problem of irregular points.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

I claim:

1. A kinematic arithmetic method for evaluating positions and orientations of imaginary links of an imaginary link mechanism in which a plurality of imaginary links are coupled through imaginary joints, comprising:

a first step of evaluating an angular acceleration or an acceleration of a joint by substituting on a numerical basis an initial value of an angle or a displacement, an initial value of an angular velocity or a velocity, and an initial value of a torque or a force, of the joint into a relation defining a relationship between the angle or the displacement, the angular velocity or the velocity, the angular acceleration or the acceleration, and the torque or the force, of the joint;

a second step of evaluating the angular velocity or the velocity, and the angle or the displacement, of the joint by practicing a numerical integration of the angular acceleration or the acceleration of the joint determined through the numerical substitution of the angle or the displacement, the angular velocity or the velocity, and the torque or the force, of the joint into said relation;

a third step of evaluating the angular acceleration or the acceleration of the joint by substituting on a numerical basis into said relation the angular velocity or the velocity, and the angle or the displacement, of the joint determined in the second step, and the initial value of the torque or the force, of the joint, or updated torque or force instead of the initial value; and a fourth step of evaluating positions and orientations of the links on the basis of the angle or the displacement of the joint determined in the second step, wherein the second step and the third step are alternately repeated, and the fourth step is repeatedly performed, thereby sequentially updating positions and orientations of the links.

2. A kinematic arithmetic method according to claim 1, wherein said relation is a relation defining a relationship between the angle or the displacement, the angular velocity or the velocity, the angular acceleration or the acceleration, and the torque or the force, of the joint, and in addition a force or a moment acting on the link, said first step is a step of evaluating the angular acceleration or the acceleration of the joint by substituting on a numerical basis into said relation the initial value of the angle or the displacement, the initial value of the angular velocity or the velocity, and the initial value of the torque or the force, of the joint, and in addition an initial value of the force or the moment acting on the link, and said third step is a step of evaluating the angular acceleration or the acceleration of the joint by substituting on a numerical basis into said relation the angular velocity or the velocity, and the angle or the displacement, of the joint determined in the second step, and the initial value of the torque or the force, of the joint, or updated torque or force instead of the initial value, and in addition an initial value of the force and the moment acting on the link, or updated force and the moment instead of the initial value.

3. A kinematic arithmetic method according to claim 2, wherein when an imaginary object is disposed within a movement area of said link mechanism, an interference force between the imaginary object and the link of said link mechanism is substituted on a numerical basis into said relation in form of a force and a moment acting on the link.

4. A kinematic arithmetic method according to claim 2, wherein when said link mechanism includes a closed loop, and when the closed loop is imaginarily cut at a predetermined position thereof, and force and moment corresponding to a mutual displacement rate between both edges created by cutting act on both the edges, said force and moment are substituted on a numerical basis into said relation in form of a force and a moment acting on two links each having an associated one of both the edges.

5. A kinematic arithmetic method according to claim 1, wherein said first and third steps are of evaluating the angular acceleration or the acceleration of the joint using Newton-Euler's equation of motion as said relation.

6. A kinematic arithmetic method according to claim 5, wherein said first and third steps are of evaluating the angular acceleration or the acceleration of the joint using a recurrence formula of evaluating the torque or the force of the link from the angular acceleration or the acceleration of the joint, based on Newton-Euler's equation of motion, and an inverse solution of evaluating the angular acceleration or the acceleration of the joint from the torque or the force of the link determined by said recurrence formula.

7. A kinematic arithmetic method according to claim 5, wherein said first and third steps are of evaluating the angular acceleration or the acceleration of the joint using a recurrence formula of evaluating the angular acceleration or the acceleration of the joint from the torque or force of the joint, based on Newton-Euler's equation of motion.

8. A kinematic arithmetic method according to claim 1, wherein said third step is a step of evaluating the angular acceleration or the acceleration of the joint by substituting on a numerical basis into said relation the angular velocity or the velocity, and the angle or the displacement, of the joint determined in the second step, and a torque according to a distance between a current position of a tip edge of the link mechanism, of the joint, and a target position.

9. A kinematic arithmetic method according to claim 1, wherein said method further comprises a fifth step of displaying the link mechanism comprising the links having positions and the orientations determined in the fourth step on a display screen for displaying the link mechanism.

10. A kinematic arithmetic apparatus for evaluating positions and orientation of imaginary links of an imaginary link mechanism in which a plurality of imaginary links are coupled through imaginary joints, comprising:

arithmetic means for evaluating an angular acceleration or an acceleration of a joint by substituting on a numerical basis an angle or a displacement, an angular velocity or a velocity, and a torque or a force, of the joint into a relation defining a relationship between the angle or the displacement, the angular velocity or the velocity, the angular acceleration or the acceleration, and the torque or the force, of the joint;

input means for inputting a torque or a force of the joint to said arithmetic means;

numerical integration means for performing a numerical integration for the angular acceleration or the acceleration of the joint determined in said arithmetic means to evaluate the angular velocity or the velocity, and the angle or the displacement, of the joint, wherein said arithmetic means receives the angular velocity or the velocity, and the angle or the displacement, which are evaluated by said numerical integration means, and evaluates the angular acceleration or the acceleration of the joint; and kinematic means for evaluating positions and orientations of the links on the basis of the angle or the displacement of the joint determined in the numerical integration means.

11. A kinematic arithmetic apparatus for evaluating positions and orientation of imaginary links of an imaginary link mechanism in which a plurality of imaginary links are coupled through imaginary joints, comprising:

arithmetic means for evaluating an angular acceleration or an acceleration of a joint by substituting on a numerical basis an angle or a displacement, an angular velocity or a velocity, and a torque or a force, of the joint into a relation defining a relationship between the angle or the displacement, the angular velocity or the velocity, the angular acceleration or the acceleration, and the torque or the force, of the joint;

input means for inputting a target position of a tip edge of the link mechanism;

torque set means for setting a torque according to a distance between a current position of the tip edge of the link mechanism, of the joint, and the target position inputted by said input means, the torque thus set being inputted to said arithmetic means;

numerical integration means for performing a numerical integration for the angular acceleration or the acceleration of the joint determined in said arithmetic means to evaluate the angular velocity or the velocity, and the angle or the displacement, of the joint, wherein said arithmetic means receives the angular velocity or the velocity, and the angle or the displacement, which are evaluated by said numerical integration means, and evaluates the angular acceleration or the acceleration of the joint; and kinematic means for evaluating positions and orientations of the links on the basis of the angle or the displacement of the joint determined in the numerical integration means.

12. A kinematic arithmetic apparatus according to claim 10, wherein said relation is a relation defining a relationship between the angle or the displacement, the angular velocity or the velocity, the angular acceleration or the acceleration, and the torque or the force, of the joint, and in addition a force and a moment acting on the link, and said arithmetic means evaluates the angular acceleration or the acceleration of the joint by substituting on a numerical basis into said relation the angle or the displacement, the angular velocity or the velocity, and the torque or the force, of the joint, and in addition the force and the moment acting on the link.

13. A kinematic arithmetic apparatus according to claim 12, wherein said apparatus further comprises imaginary object disposing means for disposing an imaginary object within a movement area of said link mechanism, and said arithmetic means substitutes an interference force between the imaginary object and the link of said link mechanism, and a moment due to the interference force, on a numerical basis into said relation in form of a force and a moment acting on the link.

14. A kinematic arithmetic apparatus according to claim 12, wherein said link mechanism includes a closed loop, and when the closed loop is imaginarily cut at a predetermined position thereof, and force and moment corresponding to a mutual displacement rate between both edges created by cutting act on both the edges, said arithmetic means substitutes said force and moment on a numerical basis into said relation in form of a force and a moment acting on two links each having an associated one of both the edges.

15. A kinematic arithmetic apparatus according to claim 10, wherein said arithmetic means evaluates the angular acceleration or the acceleration of the joint using Newton-Euler's equation of motion as said relation.

16. A kinematic arithmetic apparatus according to claim 15, wherein said arithmetic means evaluates the angular acceleration or the acceleration of the joint using a recurrence formula of evaluating the torque or the force of the link from the angular acceleration or the acceleration of the joint, based on Newton-Euler's equation of motion, and an inverse solution of evaluating the angular acceleration or the acceleration of the joint from the torque or the force of the link determined by said recurrence formula.

17. A kinematic arithmetic apparatus according to claim 15, wherein said arithmetic means evaluates the angular acceleration or the acceleration of the joint using a recurrence formula of evaluating the angular acceleration or the acceleration of the joint from the torque or force of the joint, based on Newton-Euler's equation of motion.

18. A kinematic arithmetic apparatus according to claim 10, wherein said apparatus further comprises display means for displaying the link mechanism comprising the links having positions and the orientations determined in said kinematics means on a display screen for displaying the link mechanism.

19. A kinematic arithmetic apparatus according to claim 11, wherein said relation is a relation defining a relationship between the angle or the displacement, the angular velocity or the velocity, the angular acceleration or the acceleration, and the torque or the force, of the joint, and in addition a force or a moment acting on the link, and said arithmetic means evaluates the angular acceleration or the acceleration of the joint by substituting on a numerical basis into said relation the angle or the displacement, the angular velocity or the velocity, and the torque or the force, of the joint, and in addition the force or the moment acting on the link.

20. A kinematic arithmetic apparatus according to claim 19, wherein said apparatus further comprises imaginary object disposing means for disposing an imaginary object within a movement area of said link mechanism, and said arithmetic means substitutes an interference force between the imaginary object and the link of said link mechanism, and a moment due to the interference force, on a numerical basis into said relation in form of a force and a moment acting on the link.

21. A kinematic arithmetic apparatus according to claim 19, wherein said link mechanism includes a closed loop, and when the closed loop is imaginarily cut at a predetermined position thereof, and force and moment corresponding to a mutual displacement rate between both edges created by cutting act on both the edges, said arithmetic means substitutes said force and moment on a numerical basis into said relation in form of a force and a moment acting on two links each having an associated one of both the edges.

22. A kinematic arithmetic apparatus according to claim 11, wherein said arithmetic means evaluates the angular acceleration or the acceleration of the joint using Newton-Euler's equation of motion as said relation.

23. A kinematic arithmetic apparatus according to claim 22, wherein said arithmetic means evaluates the angular acceleration or the acceleration of the joint using a recurrence formula of evaluating the torque or the force of the link from the angular acceleration or the acceleration of the joint, based on Newton-Euler's equation of motion, and an inverse solution of evaluating the angular acceleration or the acceleration of the joint from the torque or the force of the link determined by said recurrence formula.

24. A kinematic arithmetic apparatus according to claim 22, wherein said arithmetic means evaluates the angular acceleration or the acceleration of the joint using a recurrence formula of evaluating the angular acceleration or the acceleration of the joint from the torque or force of the joint, based on Newton-Euler's equation of motion.

25. A kinematic arithmetic apparatus according to claim 11, wherein said apparatus further comprises display means for displaying the link mechanism comprising the links having positions and the orientations determined in said kinematics means on a display screen for displaying the link mechanism.

* * * * *

UNITED STATES PATENT AND TRADEMARK OFFICE
CERTIFICATE OF CORRECTION

PATENT NO.: 6,027,238
DATED : February 22, 2000
INVENTOR(S): Fumio NAGASHIMA

It is certified that errors appear in the above-identified patent and that said Letters Patent is hereby corrected as shown below:

On the title page: Item
[56] References Cited

Insert --Foreign Patent Documents 4-352201  12/92  Japan--

[57] Abstract line 5, change "substituating" to --substituting--;
line 8, change "preformed" to --performed--.

Signed and Sealed this

Thirtieth Day of January, 2001

Attest:

Q. TODD DICKINSON

Attesting Officer  Director of Patents and Trademarks